United States Patent
Boissiere et al.

(10) Patent No.: US 11,124,428 B2
(45) Date of Patent: Sep. 21, 2021

(54) IRIDIUM AND / OR IRIDIUM OXIDE MICROSPHERE-BASED POROUS MATERIAL, PREPARATION METHOD THEREFOR, AND USES THEREOF

(71) Applicants: CENTRE NATIONAL DE LA RECHERCHE SCIENTIFIQUE, Paris (FR); SORBONNE UNIVERSITE, Paris (FR); UNIVERSITE PARIS DIDEROT-PARIS 7, Paris (FR)

(72) Inventors: Cédric Boissiere, Villebon sur Yvette (FR); Deborah Jones, Saint Martin de Londres (FR); Marco Faustini, Paris (FR); Jennifer Peron, Paris (FR); Cédric Tard, Vitry-sur-Seine (FR); Marion Giraud, Paris (FR)

(73) Assignees: CENTRE NATIONAL DE LA RECHERCHE SCIENTIFIQUE, Paris (FR); SORBONNE UNIVERSITE, Paris (FR)

( * ) Notice: Subject to any disclaimer, the term of this patent is extended or adjusted under 35 U.S.C. 154(b) by 0 days.

(21) Appl. No.: 16/617,227

(22) PCT Filed: Jun. 6, 2018

(86) PCT No.: PCT/FR2018/051302
§ 371 (c)(1),
(2) Date: Nov. 26, 2019

(87) PCT Pub. No.: WO2018/224771
PCT Pub. Date: Dec. 13, 2018

(65) Prior Publication Data
US 2020/0087164 A1 Mar. 19, 2020

(30) Foreign Application Priority Data
Jun. 6, 2017 (FR) .................... 17 55006

(51) Int. Cl.
| | |
|---|---|
| *C01G 55/00* | (2006.01) |
| *C08L 23/06* | (2006.01) |
| *C08L 23/12* | (2006.01) |
| *C08L 33/12* | (2006.01) |
| *C08L 53/00* | (2006.01) |

(52) U.S. Cl.
CPC ............ *C01G 55/004* (2013.01); *C08L 23/06* (2013.01); *C08L 23/12* (2013.01); *C08L 33/12* (2013.01); *C08L 53/00* (2013.01); *C01P 2002/70* (2013.01); *C01P 2004/03* (2013.01); *C01P 2004/34* (2013.01); *C01P 2004/60* (2013.01); *C01P 2006/12* (2013.01); *C01P 2006/14* (2013.01); *C08L 2203/20* (2013.01)

(58) Field of Classification Search
CPC ......... C01G 55/00; C08L 33/12; C08L 23/06; C08L 23/12; C08L 2203/20; C01P 2004/03; C01P 2004/60; C01P 2004/34; C01P 2006/12; C01P 2006/14
See application file for complete search history.

(56) References Cited

U.S. PATENT DOCUMENTS

| | | | | |
|---|---|---|---|---|
| 3,276,993 | A | * | 10/1966 | Reid, Jr. ................. B01J 37/00 208/120.1 |
| 10,607,743 | B2 | * | 3/2020 | Vose ........................ G21G 4/06 |
| 2014/0322631 | A1 | * | 10/2014 | Klose-Schubert ......................... H01M 8/04225 429/528 |

FOREIGN PATENT DOCUMENTS

| | | | |
|---|---|---|---|
| CA | 3024926 | * | 5/2018 |
| JP | 2014-073467 | * | 4/2014 |

OTHER PUBLICATIONS

JP-2014/073467 A, English translation, Apr. 24, 2014. (Year: 2014).*
Osaka A et al: "Iridium oxide films via sol-gel processing" Journal of Non-Crystalline Solids, North-Holland Physics Publishing. Amsterdam, NL, Nov. 3, 1994.
Marshall A et al: "Iridium oxide-based nanocrystalline particles as oxygen evolution electrocatalysts", Russian Journal of Electrochemistry, Nauka/Interperiodicat Mo, Oct. 1, 2006.
Seong Jung Kwon et al: "Observing Iridium Oxide {IrO x) Single Nanoparticle Collisions at Ultramicroelectrodes", Journal of the American Chemical Society, Sep. 29, 2010.
International Search Report dated Jan. 30, 2018.

* cited by examiner

*Primary Examiner* — Steven J Bos
(74) *Attorney, Agent, or Firm* — Ipsilon USA, LLP

(57) ABSTRACT

The invention relates to a porous material in the form of microspheres based on iridium and/or iridium oxide, its preparation process, its use as anodic catalyst in a water electrolyser based on a solid polymer electrolyte, also called PEM water electrolyser (with PEM meaning "Proton Exchange Membrane" or "Polymer Electrolyte Membrane") or for the manufacture of light-emitting diodes for various electronic devices or for cars, and a PEM water electrolyser comprising such a material as an anode catalyst.

19 Claims, 11 Drawing Sheets a)

b)

a)

b)

c)

a)

b)

a) b)

a)

b)

a)

b)

a)

b)

IRIDIUM AND / OR IRIDIUM OXIDE MICROSPHERE-BASED POROUS MATERIAL, PREPARATION METHOD THEREFOR, AND USES THEREOF

RELATED APPLICATION

This application is a National Phase of PCT/FR2018/051302 filed on Jun. 6, 2018, which claims the benefit of priority from French Patent Application No. 17 55006 filed on Jun. 6, 2017, the entirety of which are incorporated by reference.

Field of the Invention

The invention relates to a porous material in the form of microspheres based on iridium and/or iridium oxide, its preparation process, its use as anodic catalyst in a water electrolyser based on a solid polymer electrolyte, also called PEM water electrolyser (with PEM meaning "Proton Exchange Membrane" or "Polymer Electrolyte Membrane") or for the manufacture of light-emitting diodes for various electronic devices or for cars, and a PEM water electrolyser comprising such a material to as an anode catalyst.

The invention typically, but not exclusively, applies to the production of hydrogen from renewable resources, and in particular to iridium and/or iridium oxide materials used as catalysts to produce hydrogen.

Description of the Related Art

Hydrogen gas $H_2$, more commonly known as "hydrogen", can be used in various applications because of its high energy potential. It does not exist in the natural state, it must be made from a primary energy source, then transported, stored and distributed to the user.

Hydrogen as a source of energy can be converted into electricity, heat or driving power depending on the final use. Hydrogen can in particular be used to supply fuel cells which then constitute electrochemical converters which produce electricity and heat by oxidation of a gaseous fuel which is hydrogen and by reduction of oxygen. Hydrogen fuel cells can be used in stationary systems in the housing, industrial and network fields and in mobile systems in the field of transport and portable devices (mobile phone, computers). The use of hydrogen as the main energy carrier and fuel could contribute, on the one hand, to reducing the global dependence on fossil fuels and, on the other hand, to reducing greenhouse gas emissions ($CH_4$, $CO_2$) and air pollution (CO, $NO_R$).

Today, hydrogen is essentially produced by reforming natural gases or hydrocarbons such as propane, gasoline, diesel, methanol or ethanol or by gasification of petroleum residues or coal.

The disadvantage of these processes is that they involve fossil fuels and generally produce hydrogen with low purity (e.g. presence of carbon monoxide, carbon dioxide, sulfur compound, or other gaseous impurities).

In order to meet constant industrial needs in terms of new technologies and environmental and economic constraints, there has been a growing interest in the electrochemical conversion of water into hydrogen and oxygen by electrolysis of water, this mode of production being clean and providing hydrogen of high purity. The first water electrolyser based on solid polymer electrolyte or PEM water electrolyser was born in the 1960s and was developed by General Electric.

It is one of the most promising devices due to the high current densities achieved (i.e. of the order of $2A/cm^2$ or more). A PEM water electrolyser generally comprises two electrodes (anode and cathode) connected to a DC generator, and separated by an electrolyte (ion conductive medium) consisting of a proton exchange membrane which is also a low permeability electronic insulator to gases. Catalysts deposited on the electrodes promote the reactions.

In particular, the catalysts used in PEM electrolysers must withstand the acidic environment caused by the use of a proton exchange membrane (eg the Nafion® membrane is the most commonly used), but also at high potentials especially during operation with high current density. Now, only the noble metals (e.g. Pt, Ru, Ir) rare and expensive, can withstand the aforementioned conditions. Moreover, the anode is the seat of the oxidation reaction of water in oxygen. Anodic overcurrent or overvoltage is the main cause of irreversibility in a PEM water electrolyser.

It is therefore important for the catalyst at the anode to reduce these overcurrents or overvoltages in order to reduce the energy required for the electrolysis. Thus, some research has focused on the provision of new anode catalysts which have a reduced production cost (by their production process and/or the noble metal charge at the anode), while ensuring good catalytic performance in terms of service life and/or stability and/or "actual" catalytic activity. Iridium oxide catalysts appear as catalysts of choice combining activity and stability.

The synthesis of $IrO_2$ generally requires two steps: in a first step, amorphous iridium in the form of oxide, hydroxide or metal is prepared, then in a second step the iridium obtained is heated in particular at 500° C. to allow complete oxidation and crystallization of $IrO_2$. Iridium nanoparticles have already been prepared by various processes such as the Adams thermal process, the polyol route, the Pechini synthesis, the sol-gel method or the hydrolytic method. Most syntheses currently proposed generally lead to agglomerated particles, which does not allow to use all the active material, inducing high catalyst loads of up to 3 $mg/cm^2$ at the anode. The Adams process results in particles with irregular morphology, low yields and produces nitric oxide toxic gases, inducing the use of specific apparatus for carrying out the process. Other methods lead to porous films to improve performance in an electrolyser. However, the deposition techniques used (e.g. sputtering) do not make it possible to prepare catalyst layers that can be used in the electrolysers.

Furthermore, the patent application JP2014/073467 has described the preparation of a mesoporous material consisting of iridium oxide comprising the preparation of a solution comprising an iridium chloride, water, optionally a base, and a porogen or pore-forming agent of polyether type (eg polyether marketed under the reference Pluronic® F-127), the evaporation of at least a portion of the water from the solution, and a calcination step at a temperature ranging from 300 to 530° C. approx. Iridium oxide is used as anode catalyst in an electrolyzer. However, the electrochemical performances of such a material are not optimized (i.e. the potential from which current starts to be delivered is very high, especially greater than 1.8 V for a current density of 2 $mA/cm^2$). Furthermore, the mesoporous nature limits the evacuation of the oxygen produced at the anode during the electrolysis, in particular when the electrolysis is carried out at high current densities and/or at high pressures which induce the generation of a significant amount of oxygen in a short time.

Finally, the iridium or iridium oxide obtained is generally in the form of a powder of nanometric particles. However, the manipulation of nanoparticles in powder form poses health and safety problems (see Sharifi et al., *Chem Soc Rev.*, 2012, 41, 2323-2343), and is currently often the subject of a systematic rejection by the manufacturers. Indeed, it has already been found that nanoparticles are deposited in the deep pulmonary tract in greater proportions than large particles. Intense physical activity increases this deposit. A sunburn or lesions on the skin would be enough to allow the passage of the dermal barrier by the nanoparticles and finally the nanoparticles can carry known contaminants which can then lead, even at low dose, to a proven toxic effect (for example to a masked alteration of the DNA). From an industrial perspective point of view, the manipulation and formation of nanoparticles can also lead to the clogging of devices.

OBJECTS AND SUMMARY

Thus, the purpose of the present invention is to overcome all or part of the disadvantages of the prior art and to provide an economic material based on iridium, having a reduced toxicity for the environment, the manipulators and the users, being able to be easily handled, and having improved catalytic performance or at least similar than the materials of the state of the art, especially in terms of stability and activity, said material can be used with a reduced charging rate in a PEM water electrolyzer and may facilitate the evacuation of oxygen produced at the anode during electrolysis.

Another purpose of the invention is to provide a simple, easily industrializable, economical and environmentally friendly process for the preparation of an iridium-based material with reduced toxicity for the environment, the manipulators and the users which can be easily manipulated, and exhibits improved or at least similar catalytic performance compared to the materials of the state of the art, in particular in terms of stability and activity, said material being able to be used with a reduced charging rate in a PEM water electrolyser and can facilitate the evacuation of oxygen produced at the anode during electrolysis.

These purposes are achieved by the invention which will be described below.

The invention therefore firstly relates to an inorganic material comprising iridium and/or iridium oxide $IrO_2$, characterized in that it is macroporous and is in the form of micronic or sub-micronic spheres.

The material of the invention is economical, has reduced toxicity to the environment, manipulators and users, it can be easily manipulated (by its micrometric or sub-micronic size), and it has improved catalytic performance or the least similar to those of the state of the art materials, especially in terms of stability and activity. In particular, the material of the invention has good catalytic properties under operating conditions of a high current density electrolyser (e.g. greater than or equal to $2A/cm^2$). Furthermore, it can be used with a reduced charge rate in a PEM water electrolyzer and it can facilitate the evacuation of oxygen produced at the anode during electrolysis.

In the invention, the term "micronic or sub-micronic" means that the spheres have a mean diameter in the micron to sub-micron ranges. In particular, their average diameter may vary from a hundred nanometers to a dozens of micrometers In the invention, the inorganic material is in the form of spheres. In other words, the particles forming the material advantageously have a spherical or spheroidal external geometry. Spheroidal means any geometry resulting from the deformation of a sphere.

The material of the invention has an organized porosity and a hierarchical structure, giving it the aforementioned properties and advantages.

According to a preferred embodiment of the invention, the spheres have a mean diameter (in number) of at least about 100 nm, preferably ranging from about 100 nm to about 40 µm, more preferably from about 150 nm to about 3 µm. and more preferably from about 200 nm to about 2 µm.

In the invention, the average diameter (in number) of the material spheres is measured from the individual diameters of an assembly of spheres (minimum 800) on one or more scanning electron microscope (SEM) images.

The spheres of the material of the invention are preferably individual. In other words, the spheres are not self-assembled or they are not linked together. The material is therefore not in the form of a compact structure, but in the form of individual micron or sub-micron spheres. Preferably, the spheres according to the invention are not agglomerated.

In a particular embodiment, the spheres of the material of the invention have an outer wall of average thickness ranging from about 5 nm to 6 µm, preferably from about 50 nm to 250 nm, and more preferably from 100 nm to About 200 nm.

It goes without saying that the thickness of the outer wall of a given sphere is less than the diameter of said sphere.

The material of the invention being macroporous, it comprises macropores of average size greater than about 50 nm.

The macropores may be at a distance from each other between approximately 75 nm and 2 µm, preferably between 100 nm and 800 nm, and more preferably between 100 nm and 200 nm, the distance being measured from center of a first macropore in the center of a second macropore adjacent to the first macropore.

The material may further comprise mesopores, i.e. pores of average size ranging from 2 nm to 50 nm.

The presence of macropores and possibly mesopores allows to maximize the active surface which makes it possible to catalyze the water dissociation reaction. Macropores facilitate the transport of water and mesopores, if they exist, participate in the transport of gases.

In particular, the spheres of the material of the invention are macroporous. The macroporosity of the spheres of the material according to the invention can be opened and/or closed.

The macroporosity of the spheres of the material of the invention may be central and/or surface (i.e. presence of central and/or surface macropores).

The material of the invention may have a specific surface, calculated by the BET method, of at least about 6 $m^2/g$, preferably at least 10 $m^2/g$, preferably ranging from 20 to 200 $m^2/g$, more preferably varying from 20 to 150 $m^2/g$, more preferably varying from 30 to 120 $m^2/g$, and more preferably varying from 30 to 70 $m^2/g$.

When the material comprises only iridium as a metal, it preferably has a specific surface area, calculated by the BET method, ranging from 20 to 150 $m^2/g$, and more preferably ranging from 30 to 70 $m^2/g$.

When the material comprises iridium as a metal and one or more other metals M as mentioned below, it preferably has a specific surface area, calculated by the BET method, ranging from 20 to 200 $m^2/g$, and more preferably from 30 to 120 $m^2/g$.

The material of the invention may have a macroporous volume of at least 0.10 cm$^3$/g, preferably ranging from 0.15 to 2 cm$^3$/g, and more preferably varying from 0.20 to 1.6 cm$^3$/g.

The material of the invention may have a porosity level of at least about 20% by volume, based on the total volume of the material.

The material may have a polydispersity index of at least about 0.4, preferably at least about 0.45, more preferably from about 0.5 to 2.0, and more preferably from about 0.55 to 1.1. This medium polydispersity is favorable for increasing the exchange surface of the material, promoting percolation and improving the flow of gases during electrolysis.

In the invention, the polydispersity index of the material is calculated from the images of the material by scanning electron microscopy (SEM) which provides an infinite standard deviation. Measurement of size dispersion can be performed by calculating the infinite standard deviation which is the ratio of the standard deviation of the size distribution on the average diameter from a size histogram obtained by measuring the individual diameters of an assembly of spheres (minimum 800) on one or more SEM images.

The spheres of the material of the invention can be chosen from:

macroporous (and possibly mesoporous) solid spheres with a macroporous (and possibly mesoporous) outer wall, optionally mixed with macroporous (and possibly mesoporous) hollow spheres with a macroporous (and possibly mesoporous) outer wall, macroporous hollow spheres with a dense outer wall (i.e. non-porous), and macroporous (and possibly mesoporous) hollow spheres with macroporous (and possibly mesoporous) inner and outer walls, optionally mixed with macroporous (and possibly mesoporous) solid spheres with a macroporous (and possibly mesoporous) outer wall, and optionally in a mixture with macroporous (and possibly mesoporous) hollow spheres with a macroporous (and possibly mesoporous) outer wall.

When the spheres are macroporous solid spheres with macroporous outer walls, the macroporosity is generally central, surface and open.

When the spheres are macroporous solid spheres with a macroporous outer wall, the macropores have an average size ranging from 51 nm to 1 µm, and preferably from 100 nm to 600 nm.

When the spheres are macroporous hollow spheres with macroporous inner and outer double walls, the macroporosity is generally central and closed, and surface and open.

When the spheres are macroporous hollow spheres with macroporous inner and outer double walls, the macropores of the inner and outer walls have an average size ranging from 51 nm to 1 µm, and preferably from 100 nm to 600 nm, and the central macropores have an average size ranging from 100 nm to 4 µm, preferably from 200 nm to 3 µm, and more preferably from 400 nm to 2 µm.

In particular, the average size of a central macropore corresponds to the average diameter of a sphere minus twice the thickness of its outer wall, 2 times the thickness of its inner wall and twice the thickness of the space between its inner and outer walls.

When the spheres are macroporous hollow spheres with a dense outer wall, the macroporosity is generally central and closed.

In particular, the average size of a macropore corresponds to the average diameter of a sphere minus twice the thickness of its outer wall.

When the spheres are macroporous hollow spheres with a dense outer wall, the central macropores have an average size ranging from 100 nm to 4 µm, preferably from 200 nm to 3 µm, and more preferably from 400 nm to 2 µm.

When the spheres are macroporous hollow spheres with macroporous outer walls, the macroporosity is generally central, and surface and open.

In particular, the average size of a macropore corresponds to the average diameter of a sphere minus twice the thickness of its outer wall.

Macroporous (and optionally mesoporous) solid spheres with a macroporous (and possibly mesoporous) outer wall, optionally mixed with macroporous (and possibly mesoporous) hollow spheres with a macroporous (and possibly mesoporous) outer wall, are particularly preferred. Indeed, they lead to a more stable material having improved mechanical strength, especially when used in an electrolyser as a catalyst, particularly when high current densities are implemented. They also lead to a material ensuring better management of the gases produced during electrolysis.

In the invention, the average size of the mesopores of the material is calculated from the mesopore size distribution obtained by nitrogen physisorption using the methods B.E.T (for Brunauer-Emmett-Teller surface area analysis method) and B.J.H (for Barrett, Joyner, and Halenda is a well known procedure for calculating pore size distributions from experimental isotherms using the Kelvin model of pore filling).

The average size of the macropores of the material is calculated from the macropore size distribution obtained by scanning electron microscopy (surface macroporosity) and/or obtained by combining liquid phase laser particle size distribution and scanning electron microscopy (central macroporosity).

The iridium (or iridium oxide) of the material of the invention may be in the amorphous, crystalline phase, or comprise an amorphous and crystalline phase mixture, or preferably be in the amorphous phase or comprise a mixture of amorphous and crystalline phases. In the latter case, this thus makes it possible to improve the catalytic performance of the material of the invention since the system obtained has a less fixed surface chemistry.

The crystalline phase of iridium, if it exists, has a cfc (centered cubic face) type structure.

The crystalline phase of iridium oxide, if it exists, has a rutile structure.

In particular, the material of the invention comprises at least a portion of the iridium or iridium oxide in the amorphous phase.

The material of the invention preferably comprises iridium oxide optionally mixed with metallic iridium. Indeed, this leads to a material with improved catalytic performance (related to the presence of iridium oxide more active than metallic iridium), while ensuring improved electronic conduction (related to the presence of iridium metallic).

The material according to the invention may further comprise at least one metal M and/or one metal oxide M, said metal M being different from iridium, in particular selected from ruthenium, osmium, strontium, tin, tantalum, niobium, antimony, nickel, calcium, barium, copper, cobalt, platinum, titanium, indium, molybdenum, tungsten, gold, manganese and chromium, preferably selected from ruthenium, strontium, cobalt, molybdenum, titanium and manganese, and more preferably selected from ruthenium, cobalt and molybdenum.

The metal M may represent at most 70% by mole, preferably at most 50% by mole, and more preferably at most 40% by mole, compared to the total number of moles of iridium and M metal in the material of the invention.

The metal M may represent at least 0.1 mol %, preferably at least 1 mol %, and more preferably at least 5 mol %, based on the total number of mol of iridium and metal. M in the material of the invention.

According to a particularly preferred embodiment of the invention, the metal M may represent from 5 to 40 mol %, and more preferably from 8 to 30 mol %, compared to the total number of mol of iridium and of metal M in the material of the invention.

Ruthenium is particularly preferred, especially when it is used in a molar ratio of numbers of moleof Ru/number of mole of Ir varying from 0.0101 to 2, and preferably ranging from 0.05 to 0.7 This provides a stable material while ensuring good electrochemical performance.

The material of the invention preferably consists essentially of iridium and/or iridium oxide, and a metal M and/or an oxide of metal M if they exist.

In the invention, the term "substantially constituted" means that the material comprises at least 90% by weight, preferably at least 95% by weight, and more preferably at least 98% by weight, of iridium and/or iridium oxide, and an M metal and/or a metal oxide M if they exist, relative to the total mass of said material.

The second object or purpose of the invention is a process for preparing a material in conformity with the first object or purpose of the invention, characterized in that it includes at least the following steps:

i) the preparation of an aqueous solution or suspension comprising at least one iridium precursor and at least one porogen or pore-forming agent chosen from organic polymers and copolymers and one of their mixtures, ii) atomizing the aqueous solution or suspension obtained in step i), to form solid composite beads comprising iridium and the porogen or pore-forming agent and/or the material according to the first subject of the invention, and iii) the calcination of the solid composite beads obtained in the preceding step ii) if they exist.

The process of the invention is simple, easily industrialized economical, environmentally friendly, and it allows in a few steps to lead to a material with improved or at least similar catalytic performance compared to state-of-the-art materials, in particular in terms of stability and activity.

Moreover, it does not require any particular filtration step (s) and/or purification (s) and does not release toxic waste.

In addition, the method allows to control the porosity of the material obtained, the size of the spheres and the respective proportions of metallic iridium and of iridium oxide in said material. Finally, the size of the spheres being micrometric or sub-micrometric, the problems in terms of toxicity and recycling related to the use of nanoparticles are eliminated.

The (aqueous) solvent of the aqueous solution or suspension is preferably water.

In step i), the iridium precursor is preferably dissolved in an aqueous solvent such as water, and then the porogen or pore-forming agent is added.

According to a preferred embodiment of the invention, the molar ratio number of moles of aqueous solvent/number of moles of iridium precursor is between 20 and 10,000.

According to a preferred embodiment of the invention, the molar ratio number of moles of aqueous solvent/number of moles of metal precursor M is between 20 and 10,000.

The molar ratio of the number of moles of monomer units of the porogen or pore-forming agent/mole number of iridium in said aqueous solution or suspension preferably ranges from 0.0005 to 7, and preferably from 0.001 to 5.

The porogen or pore-forming agent preferably has a molar mass of between $800*10^6$ and $500*10^7$ g/mol.

The porogen or pore-forming agent may be chosen from homopolymers and copolymers of acrylates, methacrylates, ethylene oxide, methylene oxide, propylene oxide, epichlorohydrin, allyl glycidyl ether, styrene, butadiene and a mixture thereof.

According to a preferred embodiment of the invention, the porogen or pore-forming agent is a polymethyl methacrylate, a block copolymer of ethylene oxide and propylene oxide or a mixture thereof, and preferably a polymethyl methacrylate.

As block copolymers of ethylene oxide and propylene oxide, we can mention the one marketed under the reference Pluronic® F-127.

The molar ratio of the number of moles of monomer units of the porogen or pore-forming agent/number of moles of iridium in said aqueous solution or suspension preferably varies from 0.11 to 3 when the porogen or pore-forming agent used is polymethyl methacrylate.

The molar ratio of the number of moles of monomer units of the porogen or pore-forming agent/number of moles of iridium in said aqueous solution or suspension preferably ranges from 0.001 to 3, and more preferably from 0.005 to 3, when the porogen or pore-forming agent used is the Pluronic® F-127.

A polymethyl metacrylate is particularly preferred. Indeed, it makes it possible to obtain a more stable material having improved mechanical strength, especially when it is used in an electrolyser as a catalyst, in particular when high current densities (ie greater than $1 \text{ A} \cdot \text{cm}^{-2}$) are implemented.

It can also make it possible to obtain a material that provides better management of the gases produced during electrolysis.

The porogen or pore-forming agent may be soluble (i.e. formation of an aqueous solution) or non-soluble (i.e. formation of an aqueous suspension) in water.

Examples of water-soluble porogen or pore-forming agents include block copolymers of ethylene oxide and propylene oxide or polybutadienes.

Examples of water-insoluble porogen or pore-forming agents include polymethyl methacrylates or polystyrenes.

Water-insoluble porogen or pore-forming agents are particularly preferred.

When the porogen or pore-forming agent is insoluble in water, it may have an average particle size (in particular spherical) ranging from 51 to 1000 nm, and preferably from 100 to 600 nm.

The type of porogen or pore-forming agent used has an influence on the morphology and the porosity of the spheres obtained at the end of step iii). In particular, the type of porogen or pore-forming agent has an influence on the type of outer surface or wall obtained.

A porogen or pore-forming agent which is soluble in water preferably leads to macroporous hollow spheres with a dense outer wall (central and closed porosity).

A porogen or pore-forming agent insoluble in water preferably leads to macroporous solid spheres with a macroporous outer wall, optionally mixed with macroporous (and possibly mesoporous) hollow spheres with a macroporous (and possibly mesoporous) outer wall (central porosity and open surface area).

A combination of a water-soluble porogen or pore-forming agent and a water-insoluble porogen or pore-forming agent preferably leads to macroporous hollow spheres with macroporous inner and outer double walls (open surface porosities, and closed central pore), optionally mixing with macroporous solid spheres with a macroporous outer wall, and optionally mixed with macroporous (and possibly mesoporous) hollow spheres with a macroporous (and possibly mesoporous) outer wall (central porosity and open surface).

When the porogen or pore-forming agent is insoluble in water, and especially in the form of particles dispersed in water (formation of an aqueous suspension in step i)), the size of said particles has an influence on the size macropores formed during step iii) of calcination.

The iridium precursor may be chosen from chlorides, nitrates, acetates, alkoxides, bromides and iridium acetylacetonates.

The chlorides are preferred, in particular the chloride of formula $IrCl_3 \cdot xH_2O$, x being such that $0 \leq x \leq 5$ or the chloride of formula $IrCl_4 \cdot xH_2O$, x being such that $0 \leq x \leq 5$.

When the material comprises a metal M and/or a metal oxide M as defined in the first object or purpose of the invention, the aqueous solution or suspension further comprises at least one metal precursor M, and preferably at least one ruthenium precursor such as ruthenium chloride of formula $RuCl_3 \cdot xH_2O$, x being such that $0 \leq x \leq 3$, or a cobalt precursor such as cobalt chloride of formula $CoCl_2 \cdot 6H_2O$, or a molybdenum precursor such as Molybdenum chloride of $MoCl_5$ formula.

According to a preferred embodiment of the invention, step i) can be performed:

by preparing an aqueous solution A comprising the iridium precursor (and the metal precursor M if it exists);

by preparing a solution or an aqueous suspension B comprising the porogen or pore-forming agent; and by mixing the aqueous solution A with the aqueous solution or suspension B.

Step i) is generally performed at room temperature (i.e., 20-25° C.).

During step ii), the chemical conversion of the iridium precursor to iridium and/or iridium oxide (and the chemical transformation of the metal precursor M to M metal and/or metal oxide M if the metal precursor M exists) takes place, in particular by "sol-gelling" type condensation.

During step ii), the temperature may vary from 35° C. to 1000° C., preferably from 50° C. to 800° C., and more preferably from 65° C. to 375° C.

In step ii), either solid composite beads comprising iridium and the pore-forming agent, or the material according to the invention, or a mixture of the solid composite beads and the material according to the invention are obtained.

In other words, the atomization of step ii) allows to form solid composite beads comprising iridium and the pore-forming agent, which can in turn be transformed at least partly or completely into material according to the invention during this same step ii).

The transformation of solid composite beads into a material according to the invention occurs especially when the operating conditions of stage ii) (e.g. temperature) allows to completely or partially remove the porogen or pore-forming agent from said beads.

In the invention, the expression "atomization" well known under the "spray-drying" technology is a method of dehydration of a liquid in the form of powder by passing through a flow of hot air.

Atomization allows to control the size and the structure of the solid composite beads formed during step ii), and thus to form spheres (ie the material according to the invention) directly at the end of step ii) and/or at the end of the subsequent step iii).

In other words, a simple evaporation step with air or in the presence of any other gas, water or solvent in a solution or suspension cannot form the solid composite beads and then spheres as defined in the first subject of the invention.

According to a first variant of the invention, step ii) leads to the solid composite beads, optionally mixed with the material according to the invention. Step ii) is therefore followed by the subsequent step iii) of calcination of said beads.

According to a second variant, step ii) leads to the material of the invention. Subsequent step iii) of calcination is therefore not necessary.

The atomization step ii) may comprise the following substeps:

ii-1) spraying the aqueous solution or suspension obtained in step i), to form droplets of said aqueous solution or suspension, ii-2) drying the droplets in the presence of a flow of a hot gas, to form solid composite beads comprising iridium and the blowing agent, and ii-3) the collection of solid composite beads and/or the material according to the invention.

Step ii) can be carried out using an atomizer, possibly coupled to an oven.

When step ii) is carried out with an atomizer coupled to an oven, step ii) can allow the solid composite beads to be converted into a material according to the invention, and the temperature can then vary from 35° C. to about 1000° C., preferably from 50° C. to 800° C.

When step ii) is carried out with an atomizer alone, this transformation may not occur or in a limited manner, and the temperature preferably varies from 65° C. to 375° C.

The size of the composite beads obtained at the end of step ii) can be modulated according to the proportion of non-volatile materials (ie iridium precursor and porogen or pore-forming agent) in the solution or aqueous suspension sprayed in step i).

The spraying can be carried out by means of pressurized nozzles, monofluid, bifluid, trifluid, centrifugal or ultrasonic nozzles.

The drying step ii-2) comprises the "actual" drying of the droplets, and also the chemical conversion of the iridium precursor to iridium and/or iridium oxide (and the chemical transformation of the metal precursor M into metal M and/or metal oxide M if the metal precursor M exists), in particular by "sol-gelling" type condensation.

In step ii-2), the temperature may vary from 35° C. to 1000° C., preferably from 50° C. to 800° C., and more preferably from 65° C. to 375° C.

This temperature generally corresponds to the temperature of the hot gas during the bringing into contact of said hot gas with the droplets from step ii-1).

When an atomizer is used in step ii) [and also in steps ii 1), ii-2) and ii-3)], the inlet temperature of the atomizer (step ii-2)) can vary from 35° C. to 1000° C., preferably from 50° C. to 800° C., and more preferably from 65° C. to 375° C.

The outlet temperature of the atomizer (i.e. the collection zone, step ii-3)) may vary from 20° C. to 350° C., and preferably from 80° C. to 150° C.

The hot gas used is preferably nitrogen or hot air.

The calcination step iii) is carried out in order to eliminate all of the porogen or pore-forming agent from the solid composite beads.

The calcining step iii) can also be carried out in order to complete the densification of the material according to the invention of step ii) and/or to crystallize partially or totally the material according to the invention of step ii).

The calcination step is preferably carried out at a temperature of at least 300° C., and more preferably at least 350° C.

The calcination step is preferably carried out at a temperature of at most 850° C., more preferably at most 600° C., and more preferably at most 550° C. This prevents complete crystallization of iridium and/or iridium oxide, and thus to improve the electrochemical performance of the material of the invention.

According to a particularly preferred embodiment of the invention, the calcination step is carried out at a temperature ranging from 375 to 550° C., preferably from 390 to 475° C., and more preferably from 400 to 450° C.

When the material comprises only iridium as metal, the calcination step is carried out at a temperature ranging from 375 to 550° C., preferably from 390 to 475° C., and more preferably from 400 to 450° C.

When the material comprises iridium as a metal and one or more other metals M as mentioned above, the calcination step is carried out at a temperature ranging from 375 to 850° C., and preferably from 400 to 850° C.

Step iii) may be carried out under an oxidizing atmosphere (e.g., under air or under oxygen) or under an inert atmosphere (e.g., under nitrogen or argon) or under a reducing atmosphere (e.g., under hydrogen).

The atmosphere used controls the diffusion of oxygen during step iii), and thus promotes either the formation of iridium oxide or that of metallic iridium.

In particular, an oxidizing atmosphere is advantageous for leading mainly to iridium oxide and an inert atmosphere is advantageous for leading mainly to iridium metal.

Duration, speed of reaction and maximum calcination temperature also influence the diffusion of oxygen.

In particular, a long calcination time and/or a slow heating rate during calcination and/or a higher maximum heating temperature is advantageous for promoting the formation of iridium oxide; and a short calcination time and/or a fast heating rate during calcination and/or a lower maximum heating temperature is advantageous for promoting the formation of metal iridium.

The duration of step iii) generally varies from 15 minutes to 5 hours, and preferably from 20 minutes to 4 hours.

According to a first variant, step iii) can be carried out according to the following substeps:

Heating a temperature $T_{c1}$ varying from 15 to 30° C. to a temperature $T_{c2}$ varying from 375 to 550° C., preferably from 390 to 475° C., and more preferably from 400 to 450° C., for 5 to 30 minutes, then heating at $T_{c2}$ temperature for 5 to 30 min.

According to a second variant, step iii) can be carried out according to the following substeps:

Heating a temperature $T_{c1}$ varying from 15 to 30° C. to a temperature $T_{c2}$ varying from 375 to 550° C., preferably from 390 to 475° C., and more preferably from 400 to 450° C., during 2 h to 4 h30, then heating at $T_{c2}$ temperature for 5 to 30 min.

It should be noted that when a water-soluble porogen or pore-forming agent (respectively a block copolymer of ethylene oxide and propylene oxide) is used, the second variant is particularly suitable.

It should be noted that when a porogen or pore-forming insoluble in water optionally mixed with a porogen or pore-forming agent soluble in water (respectively a polymethacrylate optionally mixed with a block copolymer of ethylene oxide and propylene oxide) is used, the first and second variants can be used.

The method may further comprise a step iv) of preparing an ink comprising the material of the invention, an aqueous and/or organic solvent, optionally an agent conferring electronic conductivity and optionally a polymeric binder.

The aqueous solvent may be water.

The electronic conductivity conferring agent may be selected from carbon black, SP carbon, acetylene black, carbon fibers and nanofibers (VGCF-S vapor phase carbon egfibers for "vapor ground carbon fibers" in English), carbon nanotubes, oxidized-reduced graphene, oxidized graphene, graphite, metal particles and fibers and one of their mixtures.

Carbon black is preferred.

The polymeric binder may be any polymeric binder conventionally used in a water electrolyser, such as a copolymer of tetrafluoroethylene and perfluorosulfonic acid (e.g., Nafion®).

This step iv) may be followed by a step v) of depositing the ink on a support to lead to at least one catalytic layer.

Thanks to the hierarchical structure and the organized porosity of the material of the invention, the catalytic layer obtained is a porous layer.

The support may be an electrode (e.g. anode) or a temporary support such as a thin polymer film such as Teflon™ (PTFE) or Kapton™ (polyimide).

In the catalytic layer, the spheres are in contact to provide electronic conduction.

The depositing step v) may be carried out according to methods that are well known to those skilled in the art, in particular by spraying, coating or inkjet printing.

Step v) may be followed by a step vi) of transfer of the catalytic layer, in particular by the method well known under the Anglicism "decaltranfer".

This technique generally consists of developing the catalytic layer on a temporary support (step v)) and then transferring it to a membrane of an electrolyser (step vi)).

Step vi) can be carried out by hot pressing.

The material obtainable by the method according to the second object or purpose of the invention may be as defined in the first object or purpose of the invention.

The third object of the invention is the use of a material according to the first object or purpose of the invention or obtained by a process according to the secondobject or purpose of the invention, as a catalyst, and in particular anode catalyst in a PEM water electrolyser.

The fourth object or purpose of the invention is the use of a material according to the first object or purpose of the invention or obtained by a process according to the second object or purpose of the invention, for the manufacture of light-emitting diodes (LEDs) for various electronic devices such as than smartphones, tablets or televisions, or for the cars.

Indeed, the material according to the first object or purpose of the invention or obtained by a method according to the second object or purpose of the invention can be in the form of an iridium-based crucible used to manufacture electroluminescent diodes.

The subject of the invention is a PEM water electrolyser comprising at the anode a material according to the first object or purpose of the invention or obtained according to a process according to the second object or purpose of the invention.

The anode may in particular comprise a surface amount of material of at most 3 mg/cm², and preferably a quantity of at most 2 mg/cm².

BRIEF DESCRIPTION OF THE DRAWINGS

(FIG. 6c) and an SEM image of the $M_B$ iridium oxide marketed by Alfa-Aesar at the 300 nm scale (FIG. 6d), at the 200 nm scale (FIG. 6e) and at the 250 nm scale (FIG. FIG. 6f);

DETAILED DESCRIPTION

Examples

Figure 1:
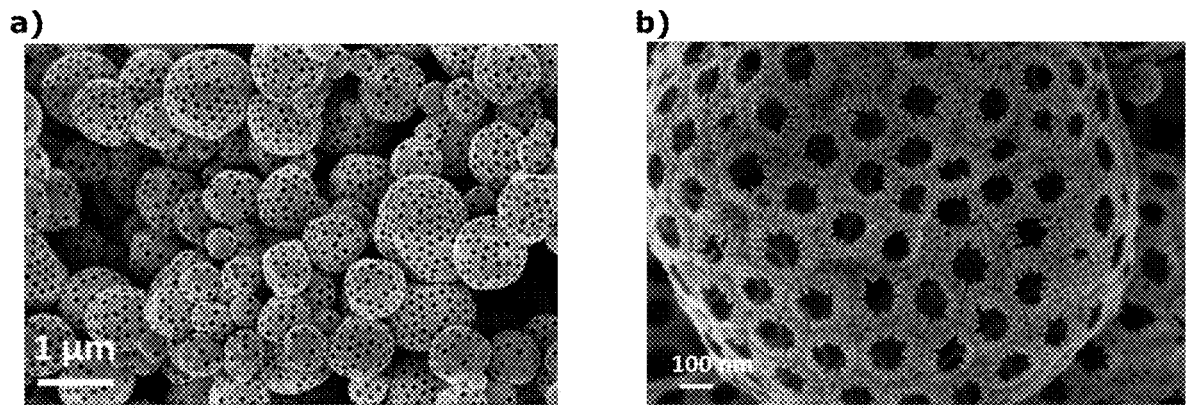
FIGS. 1A and 1B show SEM images of the material $M_1$ obtained in the example at scales 1 μm (FIG. 1a) and 100 nm (FIG. 1b)

Materials's characterization:

The specific surface of the materials was measured by adsorption-desorption of nitrogen and the B.E.T method, using an apparatus sold under the trade name Belsorp-max by MicrotracBEL.

The materials were analyzed by scanning electron microscopy (SEM) using an apparatus sold under the trade name ZEISS supra 40 by ZEISS using a field effect gun.

The materials were also analyzed by X-ray diffraction using a diffractometer sold under the trade name Panalytical X'pert pro by Panalytical and equipped with a cobalt anode and X'celerator detector.

The materials were tested by cyclic voltammetry using a potentiostat sold under the trade name Autolab PGSTAT 12 by the company Metrohm (ex-situ tests). The working electrode was a 5 mm diameter rotating disk glassy carbon electrode (Pine Instrument), gently polished and rinsed in ethanol in the presence of ultrasound before use. The counter-electrode was a platinum wire and the reference electrode an aqueous calomel electrode. All the experiments were carried out under argon at 20° C. at a rotation speed of 1600 rpm. A solution of sulfuric acid at 0.05 mol/l was prepared and used as electrolyte. To manufacture the electrode, an electrode ink comprising 1 mg of material based on iridium and/or iridium oxide, 2 mg of carbon black marketed under the reference Vulcan XC72R by Cabot, 250 μL of a solution of Nafion® 5% by mass marketed by Alfa Aesar and 250 μL of deionized water (conductivity of 0.059 μS·cm⁻²) was prepared. 8.8 μL of this ink of electrode were deposited on the surface of the working electrode to form a catalytic layer, then the whole was dried in air and left for 30 min at 100° C. in a furnace.

The materials were also characterized using an electrolytic test bench. The catalytic layers were prepared by the offset-transfer technique. The material according to the invention and a solution of perfluorosulfonated ionomer (sold under the reference Nafion®) in the form of a dispersion at 5% by weight, were mixed in a water/isopropanol solution (⅓ volume ratio) to obtain a final mass ratio: mass material according to the invention/mass (material according to the invention+ionomer) of between 10 and 50%, and preferably between 20 and 30%. The resulting solution was then deposited on a Teflon® sheet by spray. After preparation of the catalytic layers, a hot pressing step was carried out at 135° C., at a pressure of 160 kg/cm² for 90 seconds, to transfer the catalytic layers to a perfluorosulfonated membrane (sold under the reference Nafion® 115). The membrane and the anode were then again pressed at 135° C., at a pressure of 160 kg/cm² for 5 minutes with a diffusion-layer electrode constituting the cathodic catalytic layer, comprising a carbon paper on which 0.5 m/cm² of platinum is deposited. The prepared membrane-electrode assemblies were inserted into a 6.25 cm² monolayer having titanium monopolar plates coated with gold at the anode.

Example 1

Process for the Preparation of Materials According to the Invention $M_1$ and $M'_1$ An aqueous solution A comprising 1 g of $IrCl_{3-x}H_2O$ in 27 ml of water was prepared.

An aqueous suspension B comprising 0.33 g of polymethyl methacrylate in the form of beads 300 nm in diameter in 3 ml of water was prepared.

The polymethyl methacrylate beads were prepared beforehand by radical polymerization in emulsion of methyl methacrylate according to the method described in Hatton et al., PNAS, 2010, 107, 23, 10354.

28 g of solution A were mixed with 3.33 g of suspension B to form an aqueous suspension comprising 3.2% by weight of $IrCl_{3-x}H_2O$ and 1% by weight of polymethyl methacrylate, relative to the total mass of the aqueous suspension.

This aqueous suspension was sprayed using an atomizer sold under the trade name B290 by the company Buchi.

The droplets formed were dried under a stream of hot air. The inlet temperature of the atomizer was about 220° C. and its outlet temperature was about 145° C.

The composite beads obtained were then calcined according to the following substeps:

heating the composite beads in air using a heating ramp ranging from 20° C. to 450° C. for 10 minutes, and then
their heating in air at 450° C. for 15 minutes.

FIG. 1 shows SEM images of the material $M_1$ obtained in the example at scales 1 μm (FIG. 1a) and 100 nm (FIG. 1b).

Figure 2:
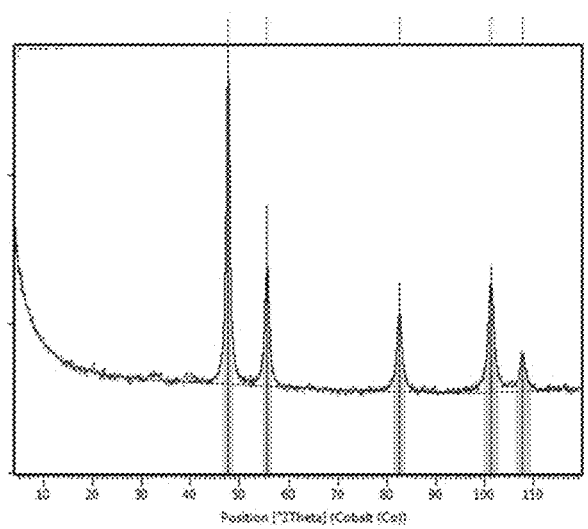
FIG. 2 shows an X-ray diffractogram of material $M_1$ obtained in the example 1.

FIG. 2 shows an X-ray diffractogram of material $M_1$ obtained in the example 1.

In this example, the material $M_1$ consisted essentially of metallic iridium, it was in the form of macroporous and mesoporous microporous and mesoporous sub-micron solid spheres with a macroporous and mesoporous outer wall, mixed with macroporous hollow and mesoporous hollow spheres. outer macroporous and mesoporous. The $M_1$ material had a specific surface area of 37 $m^2/g$. The spheres had an average diameter of 1.164 μm. The macropores had an average size of about 260 nm. The material $M_1$ comprised a mixture of amorphous and crystalline phases.

When the calcination as described above was carried out at 550° C. instead of 450° C., under the same conditions as above (ramp from 20 to 550° C. in 10 minutes in the air, then 550° C. for 15 minutes in air), the material obtained M'$_1$ consisted essentially of metallic iridium and iridium oxide with a metal iridium/iridium oxide molar ratio of approximately 80/20. The material M'$_1$ comprised a mixture of amorphous and crystalline phases. It was in the form of macroporous and mesoporous microporous and mesoporous submicron solid spheres with macroporous and mesoporous outer walls, mixed with macroporous and mesoporous hollow spheres with macroporous and mesoporous outer walls. The spheres had an average diameter of 1.164 μm. The macropores had an average size of about 260 nm.

Example 2

Process for the Preparation of Materials According to the Invention $M_2$ and M'$_2$ An aqueous solution A comprising 1 g of $IrCl_{3-x}H_2O$ in 27 ml of water was prepared.

An aqueous solution B comprising 0.33 g of polymethyl methacrylate in the form of beads 300 nm in diameter as prepared according to the process described in Example 1, in 3 ml of water was prepared.

28 g of solution A were mixed with 3.33 g of suspension B to form an aqueous suspension comprising 3.2% by weight of $IrCl_{3-x}H_2O$ and 1% by weight of polymethyl methacrylate, relative to the total mass of the aqueous suspension.

This aqueous suspension was sprayed with an atomizer as described in Example 1 and using the same sputtering and atomizing parameters.

The droplets formed were dried under a stream of hot air.
heating the composite balls in air using a heating ramp ranging from 20° C. to 450° C. for 3 h 30, and then
Their heating in air at 450° C. for 10 minutes.

Figure 3:
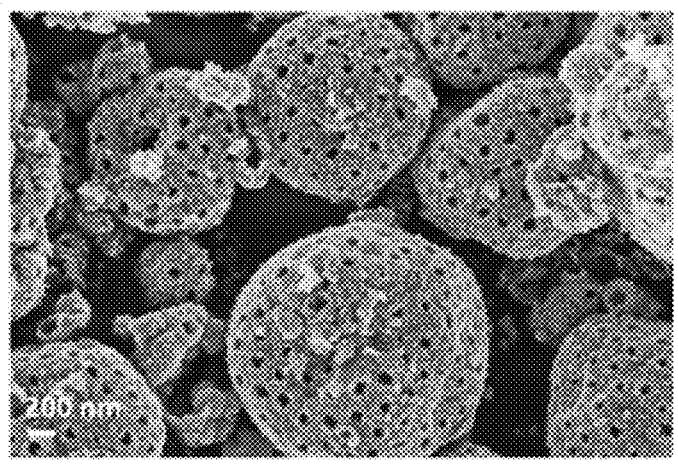
FIG. 3 shows an SEM image of the $M_2$ material obtained in Example 2 at the 200 nm scale.

FIG. 3 shows an SEM image of the $M_2$ material obtained in Example 2 at the 200 nm scale.

The material $M_2$ obtained in Example 2 comprised 20 mol % of metal iridium and 80 mol % of iridium oxide. The $M_2$ material comprised a mixture of amorphous and crystalline phases.

In this example, the material $M_2$ was in the form of macroporous and mesoporous microporous and mesoporous submicron solid spheres with a macroporous and mesoporous outer wall, mixed with macroporous and mesoporous hollow spheres with a macroporous and mesoporous outer wall. Small crystallites were present on the surface of the solid spheres and in particular of the outer wall. The macropores had a mean size (in number) of about 250 nm. $M_2$ material had a surface area of about 68 $m^2/g$. The spheres had a mean diameter (in number) of about 1.029 μm.

When the calcination as described above was carried out according to the following substeps:

heating the composite beads in air using a heating ramp ranging from 20° C. to 450° C. for 10 minutes, and then their heating in air at 450° C. for 3 hours 35 minutes, The material obtained M'$_2$ consisted essentially of metal iridium and iridium oxide with a metal iridium/iridium oxide molar ratio of about 60/40. The material M'$_2$ comprised a mixture of amorphous and crystalline phases. It was in the form of macroporous and mesoporous microporous and mesoporous submicron solid spheres with macroporous and mesoporous outer walls, mixed with macroporous and mesoporous hollow spheres with macroporous and mesoporous outer walls. The spheres had an average diameter of 1.029 μm. The macropores had an average size of about 250 nm.

Example 3

Process for the Preparation of a Material According to the $M_3$ Invention

An aqueous solution A comprising 1 g of $IrCl_{3-x}H_2O$ in 27 ml of water was prepared.

An aqueous solution B comprising 0.33 g of a block copolymer of ethylene oxide and propylene oxide sold under the reference Pluronic® F-127 in 3 ml of water was prepared.

28 g of solution A were mixed with 3 ml of solution B to form an aqueous solution comprising 3.2% by weight of $IrCl_{3-x}H_2O$ and 1% by weight of block copolymer of ethylene oxide and propylene oxide, relative to the total mass of the aqueous solution.

This aqueous solution was sprayed with an atomizer as described in Example 1 and using the same sputtering and atomizing parameters.

The droplets formed were dried under a stream of hot air.
The composite beads obtained were then calcined according to the following substeps:

heating the composite balls in air using a heating ramp ranging from 20° C. to 450° C. for 3 h 30, and then
Their heating in air at 450° C. for 10 minutes.

Figure 4:
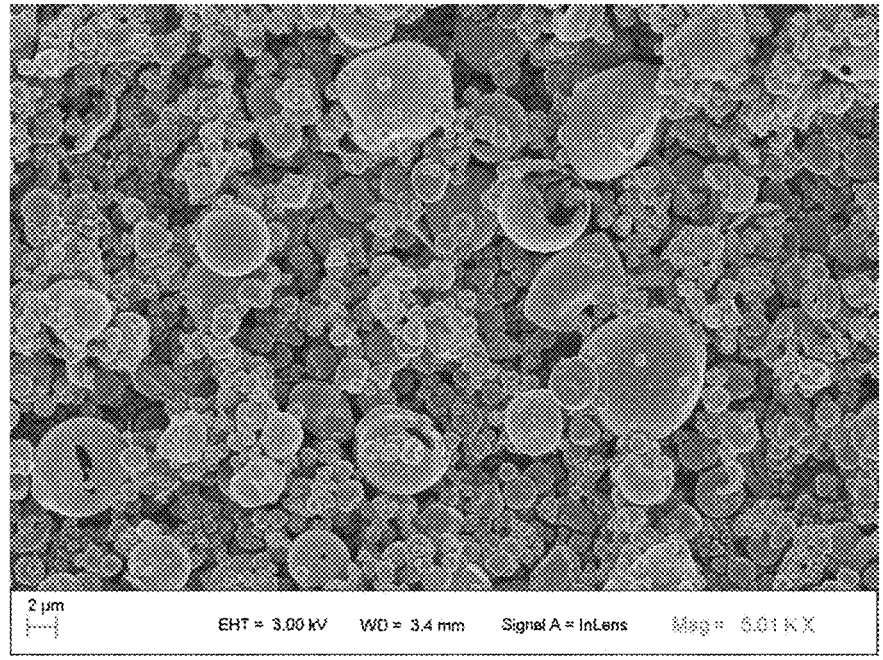
FIGS. 4A and 4B show SEM images of the material $M_3$ obtained in example 3 at the 2 μm scale (FIG. 4a) and at the 300 nm scale (FIG. 4b)
Figure 4:
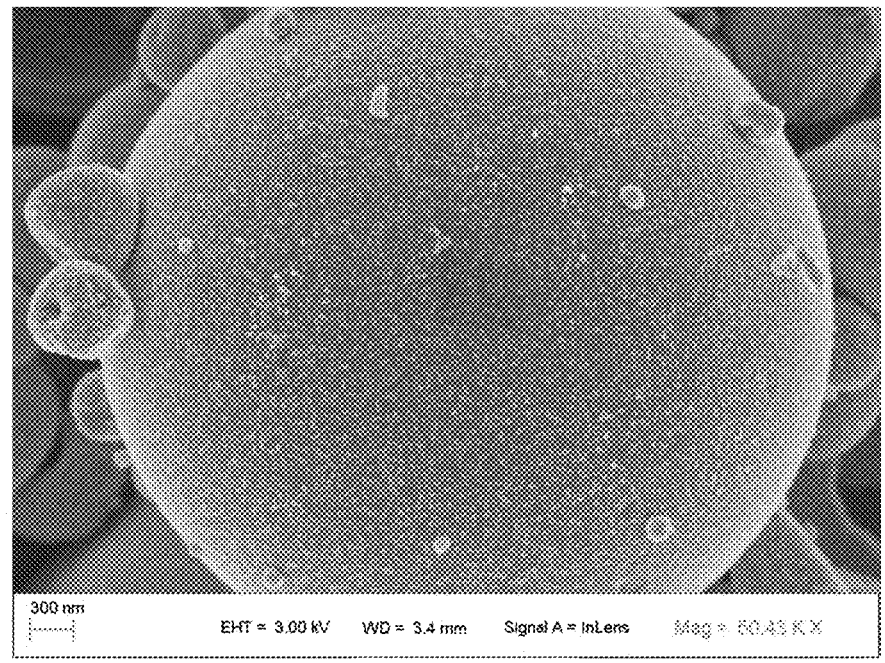

FIG. 4 shows a SEM image of the material $M_3$ obtained in example 3 at the 2 μm scale (FIG. 4a) and at the 300 nm scale (FIG. 4b).

In this example, the material $M_3$ was in the form of macroporous micron and sub-micron hollow spheres with a dense outer wall. The spheres had an average diameter of 1.780 μm. The central macropores had an average size of approximately 1.480 μm. The material $M_3$ very largely consisted of an amorphous phase.

Example 4

Process for the Preparation of a Material According to the $M_4$ Invention

An aqueous solution A comprising 1 g of $IrCl_{3-x}H_2O$ in 27 ml of water was prepared.

An aqueous suspension B comprising 0.17 g of a block copolymer of ethylene oxide and propylene oxide sold under the reference Pluronic® F-127 and 0.17 g of polymethyl methacrylate in the form of 300 nm in diameter as prepared according to the method described in Example 1, in 3 ml of water was prepared.

28 g of solution A were mixed with 3.33 g of suspension B to form an aqueous suspension comprising 3.2% by weight of $IrCl_{3-x}H_2O$, 0.5% by weight of polymethyl methacrylate and 0.5% by weight of mass of block copolymer of ethylene oxide and propylene oxide, based on the total mass of the aqueous suspension.

This aqueous suspension was sprayed with an atomizer as described in Example 1 and using the same sputtering and atomizing parameters.

The droplets formed were dried under a stream of hot air.

The composite beads obtained were then calcined according to the following substeps:

heating the composite beads in air using a heating ramp ranging from 20° C. to 450° C. for 10 minutes, and then their heating in air at 450° C. for 15 minutes.

Figure 5:
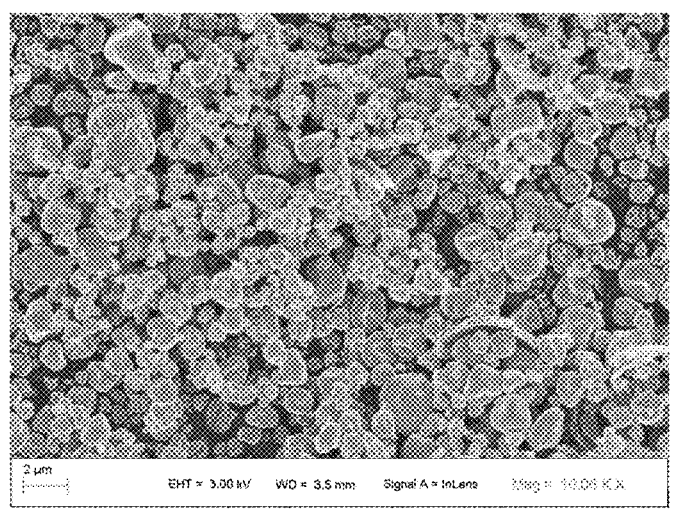
FIGS. 5A-5C show SEM images of the material $M_4$ obtained in example 4 at the 2 μm scale (FIG. 5a), at the 1 μm scale (FIG. 5b) and at the 100 nm scale (FIG. 5c)
Figure 5:
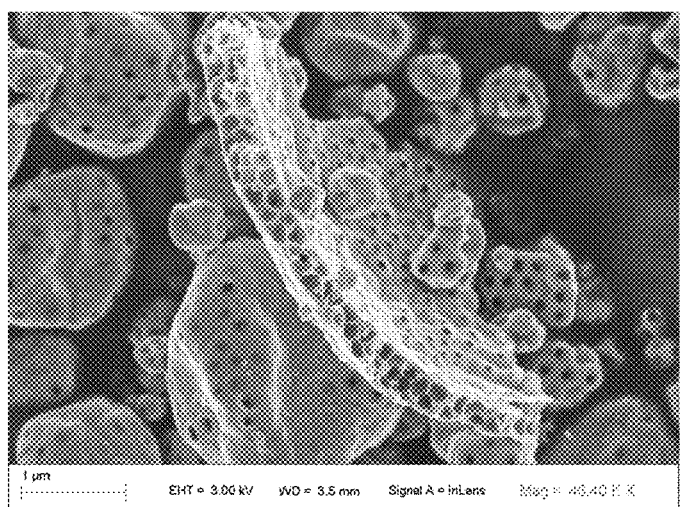
Figure 5:
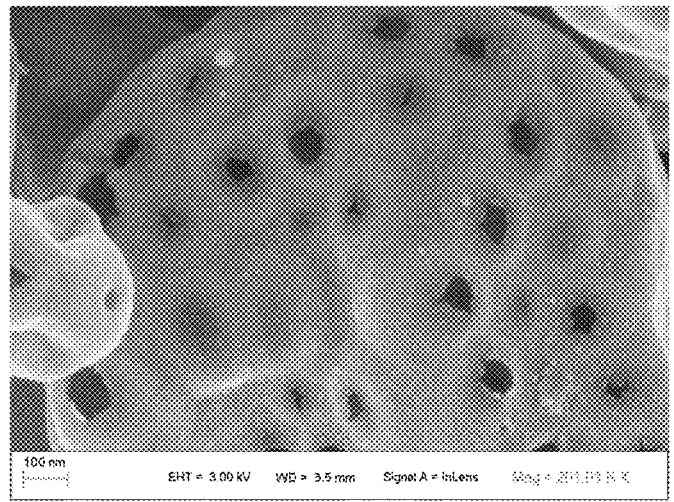

FIG. 5 shows an SEM image of the material $M_4$ obtained in example 4 at the 2 μm scale (FIG. 5a), at the 1 μm scale (FIG. 5b) and at the 100 nm scale (FIG. 5c).

In this example, the $M_4$ material was in the form of macroporous and mesoporous micron and sub-micron hollow spheres with macroporous and mesoporous inner and outer double walls. The macropores of the inner and outer walls had an average size of about 175 nm. The central macropores had an average size of about 500 nm. The spheres had an average diameter of 1.280 μm.

Figure 6:
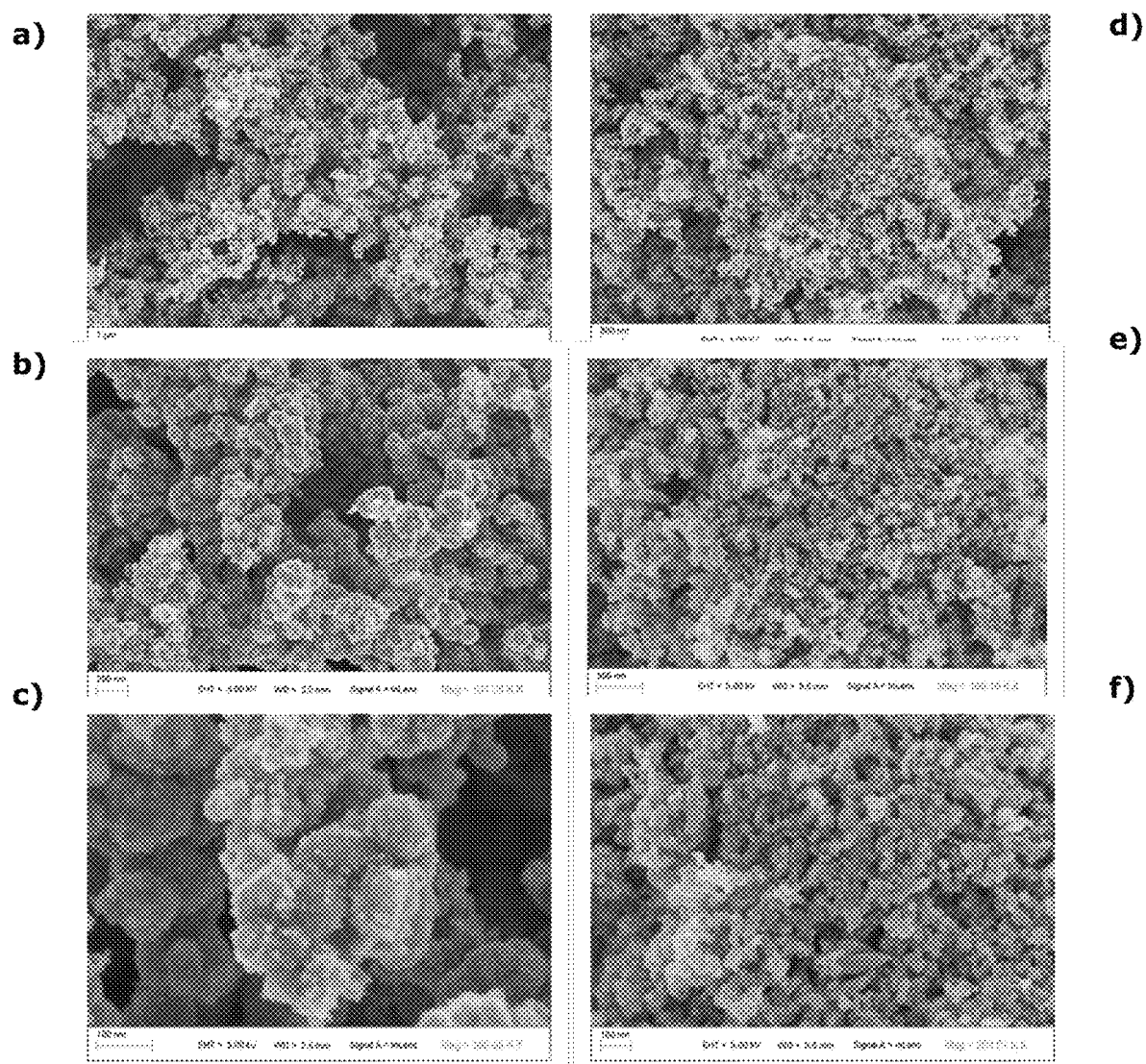
FIGS. 6A-6F shows SEM images of the $M_A$ marketed by Alfa-Aesar at the 1 μm scale (FIG. 6a), at the 200 nm scale (FIG. 6b) and at the 100 nm scale.

For comparison purposes, FIG. 6 shows a SEM image of the $M_A$ metal iridium marketed by Alfa-Aesar at the 1 μm scale (FIG. 6a), at the 200 nm scale (FIG. 6b) and at the 100 nm scale. (FIG. 6c) and an SEM image of the $M_B$ iridium oxide marketed by Alfa-Aesar at the 300 nm scale (FIG. 6d), at the 200 nm scale (FIG. 6e) and at the 250 nm scale (FIG. FIG. 6f).

These materials $M_A$ and $M_B$ are mainly in the form of crystallites. In particular, they are not macroporous and are not in the form of micron or sub-micron spheres. $M_A$ and $M_B$ materials are materials in the form of nanoparticles.

Example 5

Process for the Preparation of a Material According to the $M_5$ Invention

An aqueous solution A comprising 0.2 g of $IrCl_{3-x}H_2O$ and 0.075 g of $RuCl_{3-x}H_2O$ in 8.4 ml of water was prepared.

An aqueous suspension B comprising 0.11 g of polymethyl methacrylate in the form of beads 300 nm in diameter as prepared according to the method described in Example 1, in 0.89 ml of water was prepared.

8.675 g ml of solution A were mixed with 1 g of suspension B to form an aqueous suspension comprising 2.07% by weight of $IrCl_{3-x}H_2O$, 0.78% by weight $RuCl_{3-x}H_2O$ and 1.14% by weight of polymethyl methacrylate, based on the total mass of the aqueous suspension.

This aqueous suspension was sprayed using an atomizer sold under the trade name B290 by the company Buchi.

The droplets formed were dried under a stream of hot air. The inlet temperature of the atomizer was about 220° C. and its outlet temperature was about 145° C.

The composite beads obtained were then calcined according to the following substeps:

heating the composite balls in air using a heating ramp ranging from 20° C. to 450° C. for 3 h 30 min, then their heating in air at 450° C. for 15 minutes.

Figure 7:
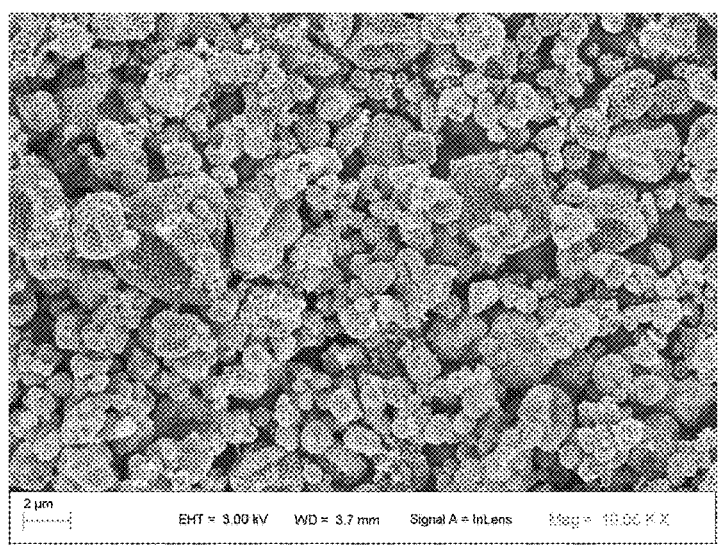
FIGS. 7A-7B show SEM images of the $M_5$ material obtained in the example at 2 μm (FIG. 7a) and 250 nm (FIG. 7b)
Figure 7:
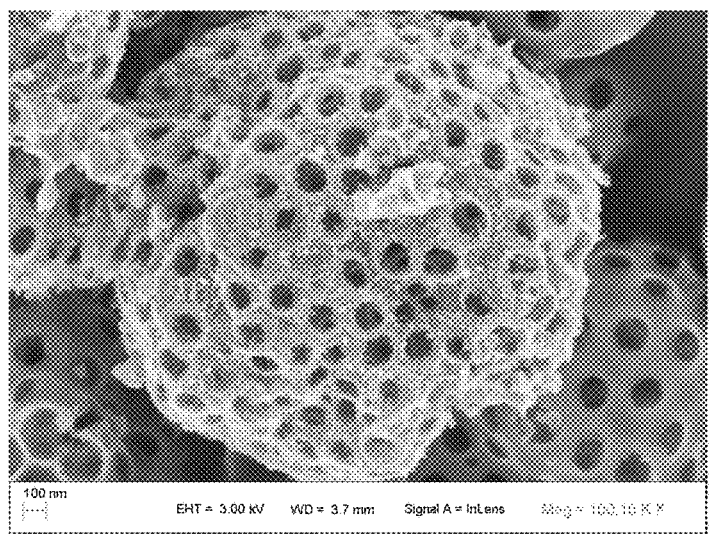

FIG. 7 shows SEM images of the $M_5$ material obtained in the example at 2 μm (FIGS. 7a) and 250 nm (FIG. 7b).

Figure 8:
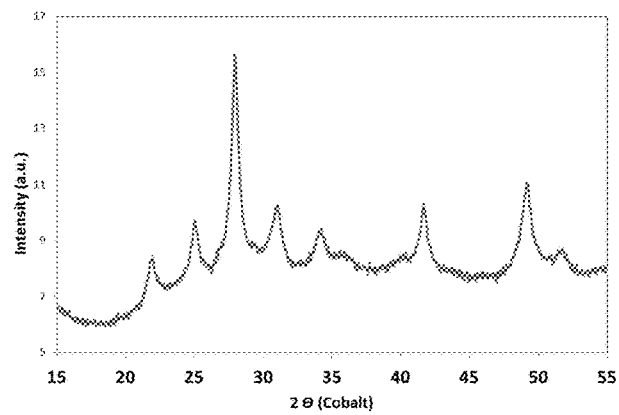
FIG. 8 shows an X-ray diffractogram of the material $M_5$ obtained in Example 5.

FIG. 8 shows an X-ray diffractogram of the material $M_5$ obtained in Example 5.

In this example, the material $M_5$ consisted essentially of a metal part and an oxide part. It was in the form of macroporous and mesoporous microporous and mesoporous submicron solid spheres with macroporous and mesoporous outer walls, mixed with macroporous and mesoporous hollow spheres with macroporous and mesoporous outer walls. The spheres had an average diameter of about 1.190 μm. The macropores had an average size of about 250 nm.

Example 6

Figure 9:
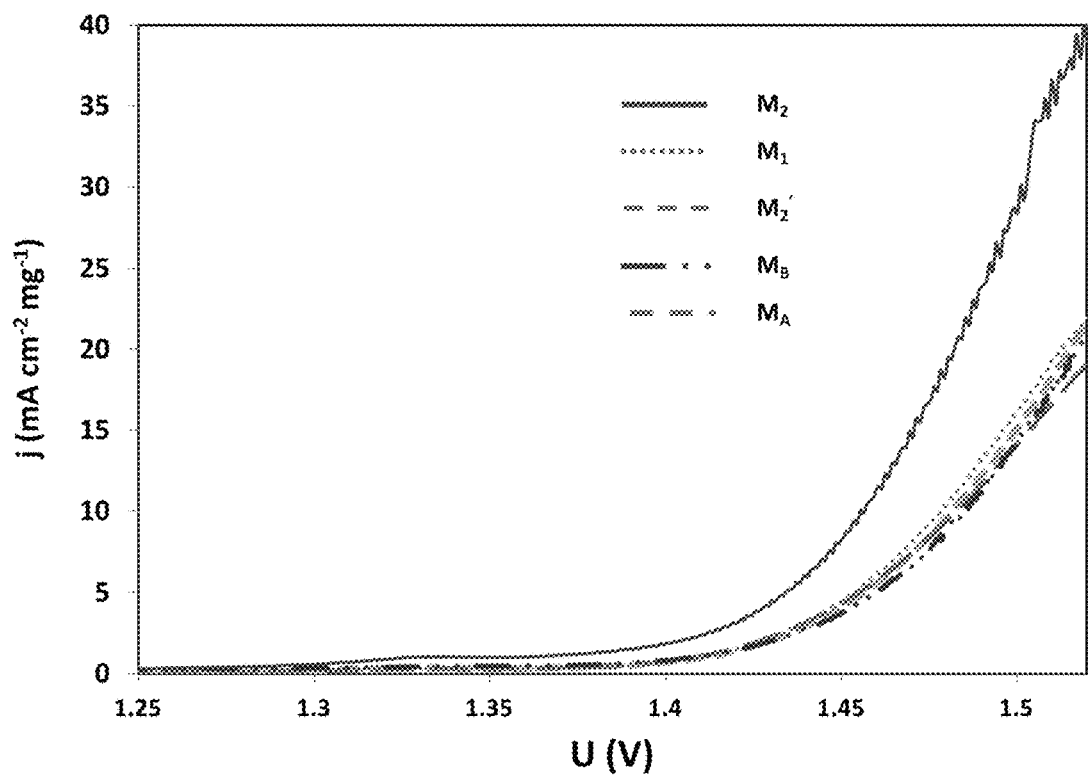
FIGS. 9a and 9b show the curve of the current density j (in mA·cm 2·mg-1) as a function of the voltage U (in volts V) of the materials according to the invention $M_1$, $M_2$, $M'_2$, $M_3$, $M_4$ and $M_5$, and for comparison commercial materials $M_A$ and $M_B$ not in conformity with the invention.
Figure 9:
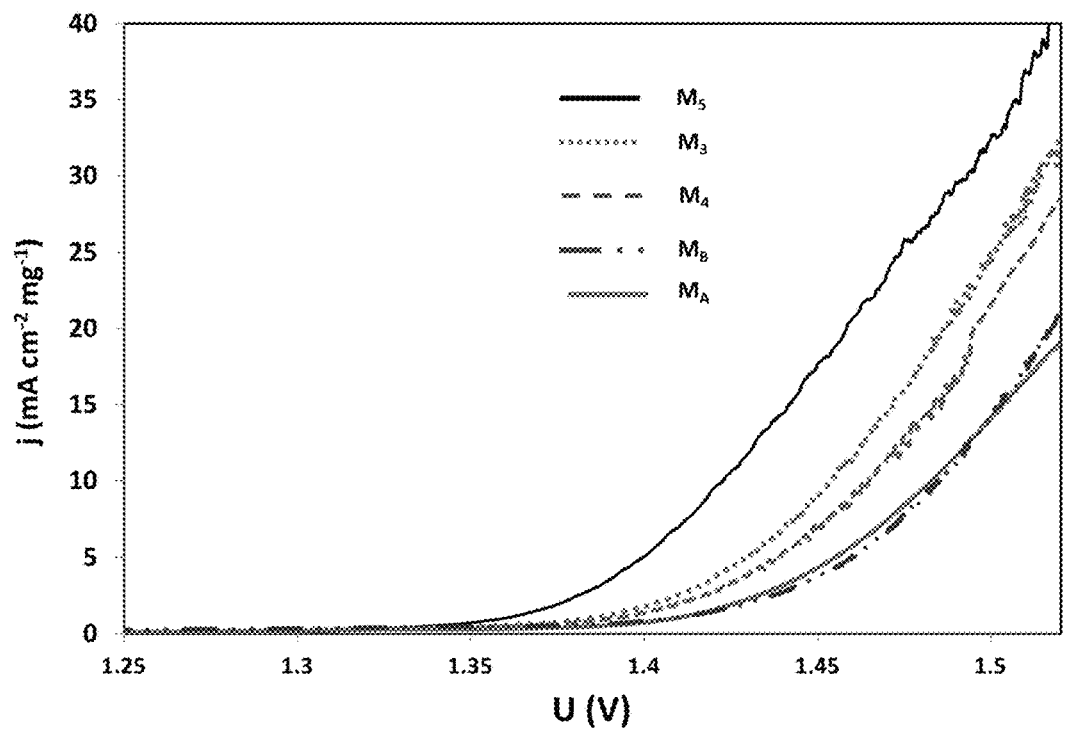

Electrochemical Characterizations of the Materials in Accordance with the Invention FIGS. 9a and 9b show the curve of the current density j (in mA·cm 2·mg-1) as a function of the voltage U (in volts V) of the materials according to the invention $M_1$, $M_2$, $M'_2$, $M_3$, $M_4$ and $M_5$, and for comparison commercial materials $M_A$ and $M_B$ not in conformity with the invention.

In FIG. 9a, materials $M_1$ and $M_2$ have cyclic voltammetry properties comparable to those of commercial materials. Moreover, these materials have the additional advantages of being more economical, less toxic and easier to handle because they are not in nanometric form as commercial materials $M_A$ and $M_B$. In addition, they are obtained from a simple process, not requiring complex and expensive equipment.

Figure 10:
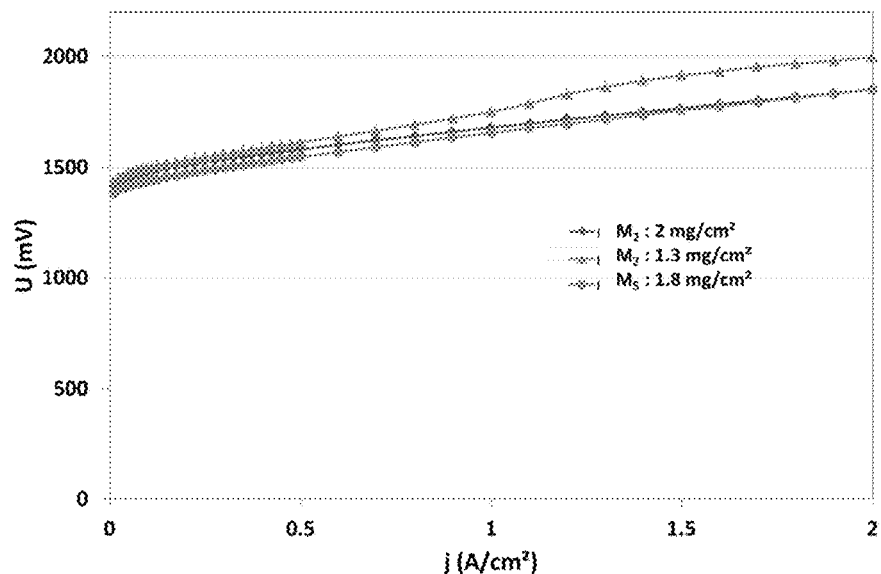
FIG. 10 shows the curve of the voltage U (in millivolts, mV) as a function of the current I (in ampere per square centimeter, A/cm²) of the materials in accordance with the invention $M_2$ (curve with the filled diamonds, load in catalyst of 2 mg/cm²), $M_2$ (curve with full triangles, loading of 1.3 mg/cm²) and $M_5$ (curve with solid circles, load of 1.8 mg/cm²)

FIG. 10 shows the curve of the voltage U (in millivolts, mV) as a function of the current I (in ampere per square centimeter, $A/cm^2$) of the materials in accordance with the invention $M_2$ (curve with the filled diamonds, load in catalyst of 2 $mg/cm^2$), $M_2$ (curve with full triangles, loading of 1.3 $mg/cm^2$) and $M_5$ (curve with solid circles, load of 1.8 $mg/cm^2$).

Example 7

Process for the Preparation of a Material in Accordance with the Invention $M_6$ Aqueous solution A comprising 1.0 g of $IrCl_{3-x}H_2O$ and 0.102 g of $CoCl_2.6H_2O$ in 29.04 ml of water was prepared.

An aqueous suspension B comprising polymethyl methacrylate in the form of beads 300 nm in diameter as prepared according to the method described in Example 1, 11% by weight was prepared.

30142 g of solution A were mixed with 3.267 g of suspension B to form an aqueous suspension comprising 3% by weight of $IrCl_{3-x}H_2O$, 0.3% by weight $CoCl_2.6H_2O$ and 11% by weight of polymethyl methacrylate, relative to to the total mass of the aqueous suspension.

This aqueous suspension was sprayed with an atomizer as described in Example 1.

The droplets formed were dried under a stream of hot air. The inlet temperature of the atomizer was about 220° C. and its outlet temperature was about 110° C. The composite beads obtained were then calcined according to the following substeps:

heating the composite balls in air using a heating ramp ranging from 20° C. to 450° C. for 3 h 30, and then their heating in air at 450° C. for 15 minutes.

Figure 11:
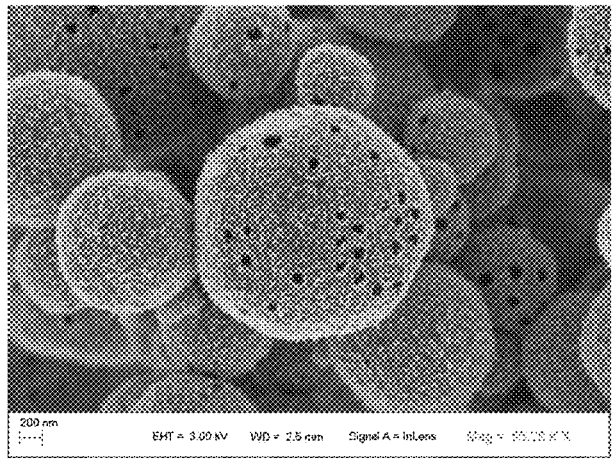
FIGS. 11A-11B show SEM images of the $M_6$ material obtained in Example 7 at the 2 μm (FIG. 11a) and 250 nm (FIG. 11b) scales.
Figure 11:
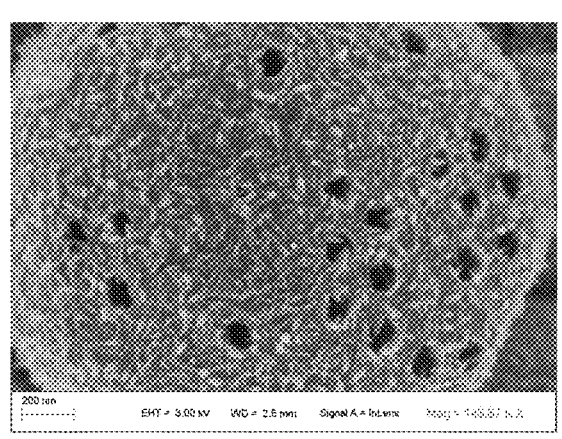

FIG. 11 shows SEM images of the $M_6$ material obtained in Example 7 at the 2 μm (FIGS. 11a) and 250 nm (FIG. 11b) scales.

Figure 12:
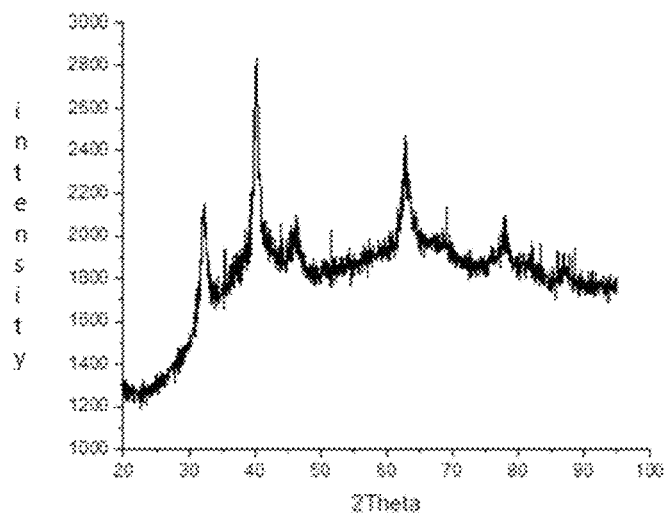
FIG. 12 shows an X-ray diffractogram of material $M_6$ obtained in Example 7.

FIG. 12 shows an X-ray diffractogram of material $M_6$ obtained in Example 7.

In this example, the material $M_6$ consisted essentially of an oxide part. It comprised 13.7 mol % of cobalt and 86.3 mol % of iridium, based on the total number of moles of metal.

The main peaks are characteristic of iridium oxide, they are shifted to large angles, which means that there is incorporation of cobalt within the structure of iridium oxide. It was in the form of macroporous and mesoporous microporous and mesoporous submicron solid spheres with macroporous and mesoporous outer walls, mixed with macroporous and mesoporous hollow spheres with macroporous and mesoporous outer walls. The spheres had a mean diameter of about 2.2 μm. The macropores had an average size of about 250 nm.

Example 8

Process for the Preparation of a Material According to the $M_7$ Invention

Aqueous solution A comprising 1.0 g of $IrCl_{3-x}H_2O$ and 0.289 g of $CoCl_2.6H_2O$ in 34.85 ml of water was prepared.

An aqueous suspension B comprising polymethyl methacrylate in the form of beads 300 nm in diameter as prepared according to the method described in Example 1, at 11% by weight was prepared.

34.85 ml of solution A were mixed with 3.935 g of suspension B to form an aqueous suspension comprising 2.50% by weight of $IrCl_{3-x}H_2O$, 0.72% by mass $CoCl_2.6H_2O$ and 1.1% by weight of polymethyl methacrylate, based on the total mass of the aqueous suspension.

This aqueous suspension was sprayed with an atomizer as described in Example 1.

The droplets formed were dried under a stream of hot air. The inlet temperature of the atomizer was about 220° C. and its outlet temperature was about 110° C. The composite beads obtained were then calcined according to the following substeps:

heating the composite balls in air using a heating ramp ranging from 20° C. to 450° C. for 3 h 30, and then their heating in air at 450° C. for 15 minutes.

Figure 13:
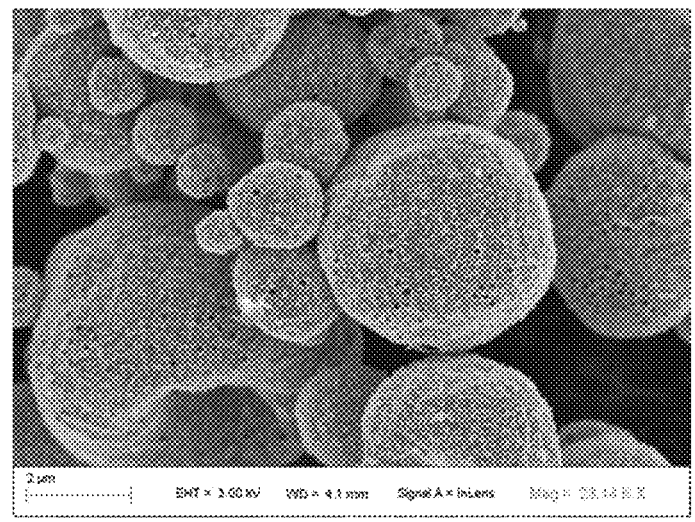
FIGS. 13A-13B shows SEM images of the $M_7$ material obtained in Example 8 at the 2 μm (FIG. 13a) and 100 nm (FIG. 13a) scales.
Figure 13:
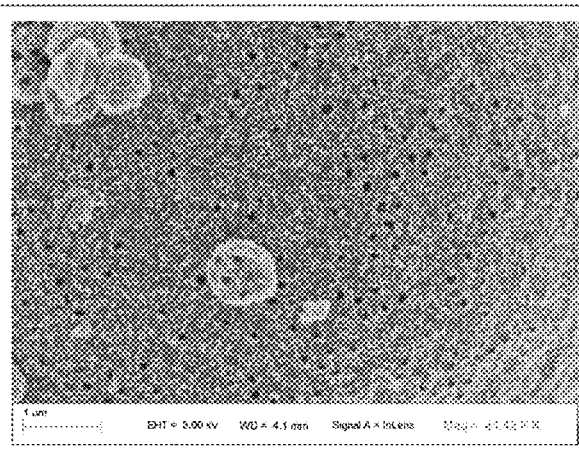

FIG. 13 shows SEM images of the $M_7$ material obtained in Example 8 at the 2 μm (FIGS. 13a) and 100 nm (FIG. 13a) scales.

Figure 14:
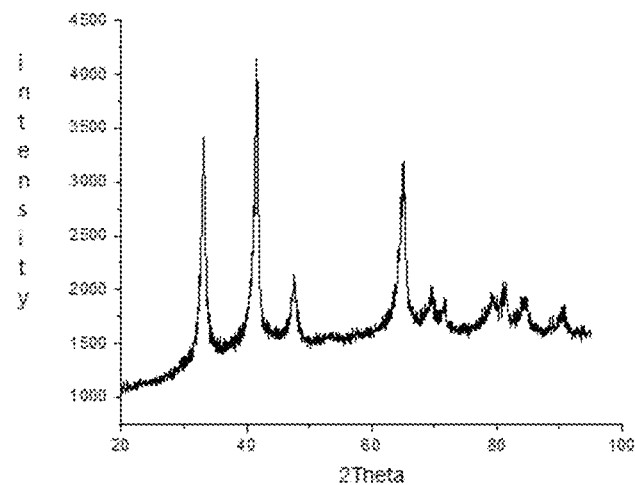
FIG. 14 shows an X-ray diffractogram of material $M_7$ obtained in Example 8.

FIG. 14 shows an X-ray diffractogram of material $M_7$ obtained in Example 8.

In this example, the material $M_7$ consisted essentially of an oxide part. It comprised 31 mol % of cobalt and 69 mol % of iridium, based on the total number of moles of metal.

The main peaks are characteristic of iridium oxide, they are shifted towards the large angles, which means that there is incorporation of cobalt. It was in the form of macroporous and mesoporous microporous and mesoporous submicron solid spheres with macroporous and mesoporous outer walls, mixed with macroporous and mesoporous hollow spheres with macroporous and mesoporous outer walls. The spheres had a diameter of between about 200 nm and about 10 μm. The macropores had an average size of about 250 nm.

Example 9

Process for the Preparation of a Material According to the Invention $M_8$

Aqueous solution A comprising 1.0 g of $IrCl_{3-x}H_2O$ and 0.086 g of $MoCl_5$ in 29.335 ml of water was prepared.

An aqueous suspension B comprising polymethyl methacrylate in the form of beads 300 nm in diameter as prepared according to the method described in Example 1, 11% by weight was prepared.

29.335 ml of solution A were mixed with 3.265 g of suspension B to form an aqueous suspension comprising 2.97% by weight of $IrCl_3.xH_2O$, 0.26% by mass $MoCl_5$ and 1.1% by weight of polymethyl methacrylate, relative to the total mass of the aqueous suspension.

This aqueous suspension was sprayed with an atomizer as described in Example 1.

The droplets formed were dried under a stream of hot air. The inlet temperature of the atomizer was about 220° C. and its outlet temperature was about 110° C. The composite beads obtained were then calcined according to the following substeps:

heating the composite balls in air using a heating ramp ranging from 20° C. to 450° C. for 3 h 30, and then their heating in air at 450° C. for 15 minutes.

Figure 15:
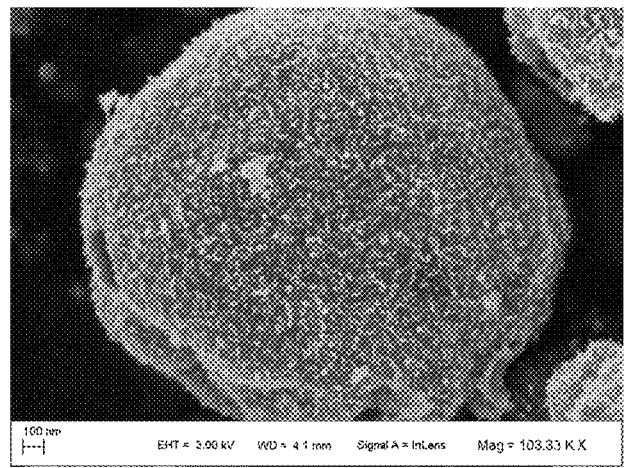
FIGS. 15A-15B shows SEM images of the material $M_8$ obtained in Example 9 at scales 2 μm (FIG. 15a) and 100 nm (FIG. 15b)
Figure 15:
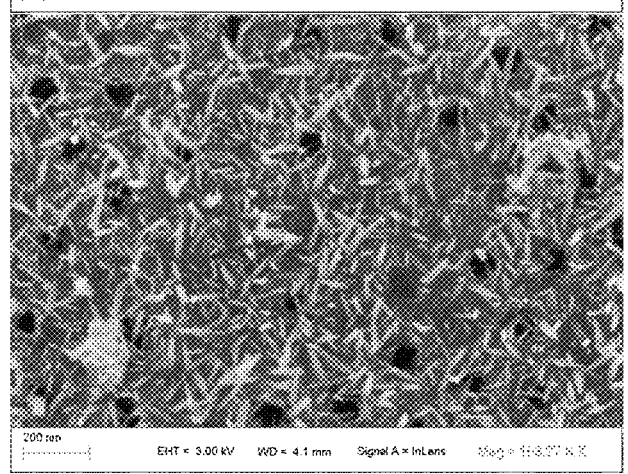

FIG. 15 shows SEM images of the material Mg obtained in Example 9 at scales 2 μm (FIGS. 15a) and 100 nm (FIG. 15b).

Figure 16:
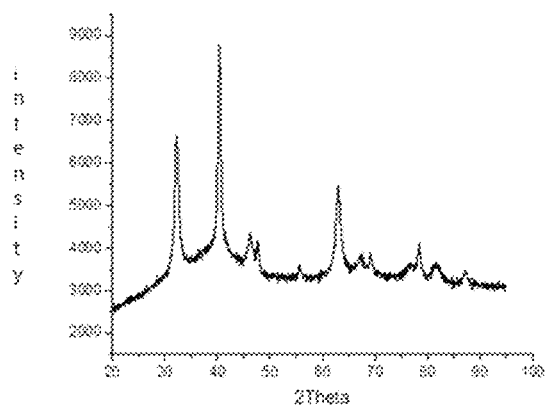
FIG. 16 shows an X-ray diffractogram of material $M_8$ obtained in Example 9.

FIG. 16 shows an X-ray diffractogram of material $M_8$ obtained in Example 9.

In this example, the material $M_8$ consisted essentially of an oxide part. It comprised 10 mol % of molybdenum and 90 mol % of iridium, based on the total number of moles of metal.

The main peaks are characteristic of iridium oxide, they are shifted to large angles, which means that molybdenum is incorporated into the iridium oxide structure. It was in the form of solid macroporous and mesoporous micronic and sub-micronic spheres with macroporous and mesoporous outer walls, mixed with macroporous and mesoporous hollow spheres with macroporous and mesoporous outer walls. The spheres had an average diameter of about 1.0 μm The macropores had an average size of about 250 nm.

Example 10

Process for the Preparation of a Material According the M₉ Invention

Aqueous solution A comprising 1.0 g of $IrCl_3 \cdot xH_2O$ and 0.331 g of $MoCl_5$ in 35.967 ml of water was prepared.

An aqueous suspension B comprising polymethyl methacrylate in the form of beads 300 nm in diameter as prepared according to the method described in Example 1, 11% by weight was prepared.

35.967 ml of solution A were mixed with 4.001 g of suspension B to form an aqueous suspension comprising 2.42% by weight of $IrCl_3 \cdot xH_2O$, 0.80% by mass $MoCl_5$ and 1.4% by weight of polymethyl methacrylate, relative to the total mass of the aqueous suspension.

This aqueous suspension was sprayed with an atomizer as described in Example 1.

The droplets formed were dried under a stream of hot air. The inlet temperature of the atomizer was about 220° C. and its outlet temperature was about 110° C. The composite beads obtained were then calcined according to the following substeps:

heating the composite balls in air using a heating ramp ranging from 20° C. to 450° C. for 3 h 30, and then their heating in air at 450° C. for 15 minutes.

Figure 17:
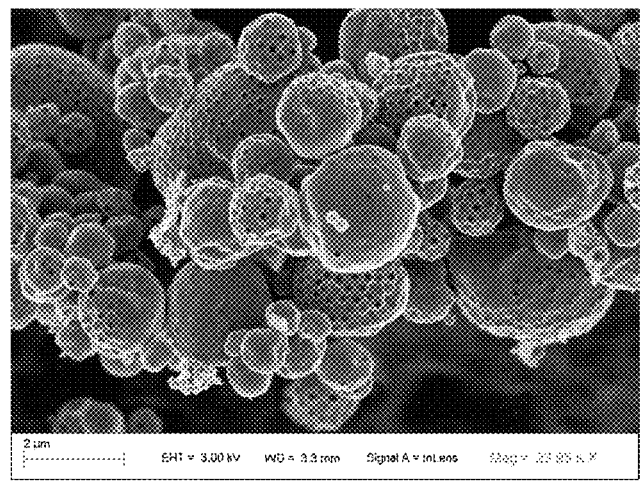
FIGS. 17A-17B shows SEM images of material $M_9$ obtained in example 10 at the 2 μm (FIG. 17a) and 100 nm (FIG. 17b) scales.
Figure 17:
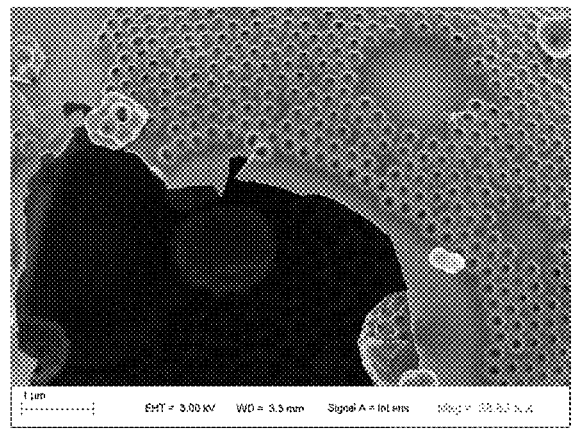

FIG. 17 shows SEM images of material Mg obtained in example 10 at the 2 μm (FIGS. 17a) and 100 nm (FIG. 17b) scales.

Figure 18:
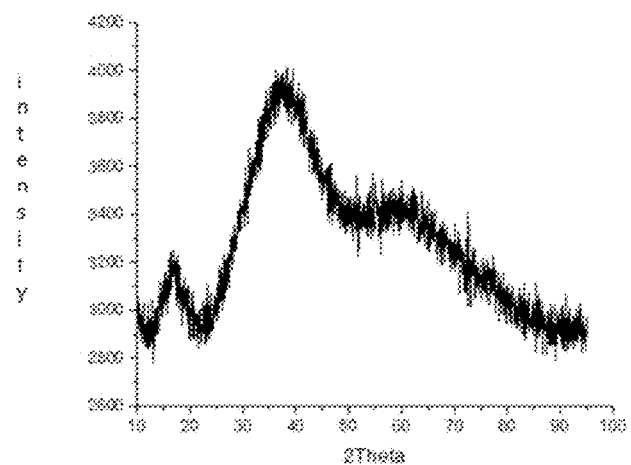
FIG. 18 shows an X-ray diffractogram of material $M_9$ obtained in Example 10.

FIG. 18 shows an X-ray diffractogram of material $M_9$ obtained in Example 10.

In this example, the material $M_9$ consisted essentially of a portion of amorphous iridium oxide. It comprised 30 mol % molybdenum and 70 mol % iridium, based on the total number of moles of metal.

It was in the form of microporous macroporous submicron solid spheres with a macroporous outer wall mixed with macroporous hollow spheres with a macroporous outer wall. The spheres had a mean diameter of about 1.0 μm. The macropores had an average size of about 260 nm.

Figure 19:
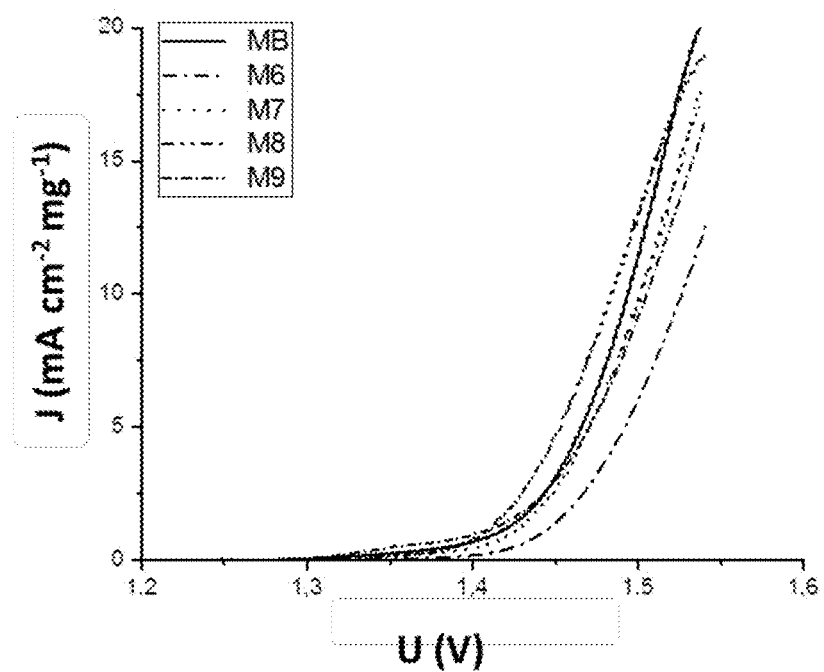
FIG. 19 shows the curve of the current density J (in mA·cm²·mg⁻¹) as a function of the voltage U (in volts V) of the materials according to the invention $M_6$, $M_7$, $M_8$, and $M_9$, and for comparison of commercial material $M_B$ not in accordance with the invention

FIG. 19 shows the curve of the current density J (in $mA \cdot cm^2 \cdot mg^{-1}$) as a function of the voltage U (in volts V) of the materials according to the invention $M_6$, $M_7$, $M_8$, and $M_9$, and for comparison of commercial material $M_B$ not in accordance with the invention.

The invention claimed is:

1. Inorganic material comprising iridium, wherein:
   said inorganic material comprises at least 90% by weight of iridium, relative to the total weight of said inorganic material, or
   said inorganic material comprises at least 90% by weight of iridium and a metal M, relative to the total weight of said inorganic material,
   wherein said inorganic material is macroporous and is in the form of micron or sub-micron spheres having a mean diameter ranging from 100 nm to 40 μm, and
   wherein said metal M is chosen from ruthenium, osmium, strontium, tin, tantalum, niobium, antimony, nickel, calcium, barium, copper, cobalt, platinum, titanium, indium, molybdenum, tungsten, gold, manganese and chromium, and said metal M represents at most 70% by mole, relative to the total number of moles of iridium and M metal in said inorganic material.

2. The inorganic material according to claim 1, wherein the spheres are individual.

3. The inorganic material according to claim 1, wherein the spheres have an external wall with a thickness varying from 5 nm to 6 μm.

4. The inorganic material according to claim 1, wherein said material has a specific surface, calculated by the B.E.T. method, varying from 20 to 200 $m^2/g$.

5. The inorganic material according to claim 1, wherein said inorganic material has a macroporous volume ranging from 0.15 to 2 $cm^3/g$.

6. The inorganic material according to claim 1, wherein the spheres are chosen from macroporous solid spheres with a macroporous outer wall, macroporous hollow spheres with a dense outer wall and macroporous hollow spheres with macroporous inner and outer double walls.

7. Process for the preparation of the inorganic material as defined in claim 1, wherein said process comprises at least the following steps:
   i) the preparation of an aqueous solution or suspension comprising at least one iridium precursor and at least one pore-forming agent chosen from organic polymers and copolymers and one of their mixtures,
   ii) atomizing the aqueous solution or suspension obtained in step i) to form solid composite beads comprising iridium and the porogen or pore-forming agent; or said material; or solid composite beads comprising iridium, the pore-forming agent, and said inorganic material,
   iii) the calcination of the solid composite beads obtained in the preceding step ii) if said solid composite beads exist.

8. Process according to claim 7, wherein in the solution or suspension obtained at the end of step i), the molar ratio number of moles of aqueous solvent/number of moles of iridium precursor is between 20 and 10000.

9. Process according to claim 7, wherein in the solution or suspension obtained at the end of step i), the molar ratio number of moles of monomer units of the porogen or pore-forming agent/number of moles of iridium ranges from 0.0005 to 7.

10. Process according to claim 7, wherein the porogen or pore-forming agent is chosen from homopolymers and copolymers of acrylate, methacrylate, ethylene oxide, methylene oxide, propylene oxide, epichlorohydrin, allyl glycidyl ether, styrene, butadiene and a mixture thereof.

11. Process according to claim 7, wherein the porogen or pore-forming agent is a polymethyl methacrylate, a block copolymer of ethylene oxide and propylene oxide or a mixture thereof.

12. Process according to claim 7, wherein the atomizing step ii) comprises the following substeps:
   ii-1) spraying the aqueous solution or suspension obtained in step i), to form droplets of said aqueous solution or suspension,
   ii-2) drying the droplets in the presence of a flow of a hot gas, to form solid composite beads comprising iridium and the porogen or pore-forming agent, and
   ii-3) collecting solid composite beads and/or said inorganic material.

13. Process according to claim 12, wherein the temperature during the drying of sub step ii-2) varies from 35° C. to 1000° C.

14. Process according to claim 7, wherein the calcination step iii) is carried out at a temperature of at least 300° C. and at most 600° C.

15. An anode catalyst in a water electrolyser based on Proton Exchange Membrane, wherein said anode catalyst comprises the inorganic material as defined in claim 1.

16. Light emitting diodes for electronic devices or for electroluminescent diodes or for cars, wherein said light emitting diode comprises the inorganic material as defined in claim 1.

17. Water electrolyser based on Proton Exchange Membrane comprising, at the anode, the inorganic material as defined in claim 1.

18. The inorganic material according to claim 1, wherein the inorganic material comprising iridium is an inorganic material comprising Iridium Oxide.

19. The inorganic material according to claim 1, wherein the inorganic material comprising iridium is an inorganic material comprising a combination of Iridium and Iridium Oxide.

\* \* \* \* \*